(12) United States Patent
Zhang et al.

(10) Patent No.: US 12,163,514 B2
(45) Date of Patent: Dec. 10, 2024

(54) CONNECTING STRUCTURE, PLUNGER PUMP DEVICE AND GENERATOR DEVICE

(71) Applicant: YANTAI JEREH PETROLEUM EQUIPMENT & TECHNOLOGIES CO., LTD., Shandong (CN)

(72) Inventors: Peng Zhang, Shandong (CN); Rikui Zhang, Shandong (CN); Xiaolei Ji, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 18/342,318

(22) Filed: Jun. 27, 2023

(65) Prior Publication Data

US 2023/0332598 A1  Oct. 19, 2023

Related U.S. Application Data

(63) Continuation-in-part of application No. 17/735,826, filed on May 3, 2022, now Pat. No. 11,702,919,
(Continued)

(30) Foreign Application Priority Data

Jan. 11, 2021 (CN) .......................... 202110030394.5
Apr. 2, 2021 (CN) .......................... 202110360761.8
(Continued)

(51) Int. Cl.
  *F04B 53/22* (2006.01)
  *E21B 43/26* (2006.01)
  (Continued)

(52) U.S. Cl.
  CPC .......... *F04B 53/22* (2013.01); *E21B 43/2607* (2020.05); *F01D 15/10* (2013.01); *F04B 17/06* (2013.01)

(58) Field of Classification Search
  CPC ...... F04B 53/22; F04B 17/06; E21B 43/2607; F01D 15/10; F05D 2260/02;
  (Continued)

(56) References Cited

U.S. PATENT DOCUMENTS 2,988,153 A   6/1961   Haworth et al.
3,350,138 A   10/1967  Wilms
(Continued)

FOREIGN PATENT DOCUMENTS

CA   2944968      8/2016
CN   2625578 Y    7/2004
(Continued)

OTHER PUBLICATIONS

International Search Report, dated Jun. 5, 2020, pp. 1-4, issued in International Patent Application No. PCT/CN2019/107019, China Intellectual Property Administration, Beijing, China.
(Continued)

*Primary Examiner* — James G Sayre
(74) *Attorney, Agent, or Firm* — Crowell & Moring LLP

(57) ABSTRACT

Some embodiments of the disclosure disclose a connecting structure, and a plunger pump device and a generator device. The connecting structure is used for connecting a bottom and a beam body; the beam body comprises a beam body and a wing plate; the connecting structure includes: a connecting body which comprises a first connecting portion and a second connecting portion which are connected with each other, wherein the first connecting portion has a first surface, the second connecting portion has a second surface, the first surface is used for mounting the bottom, and the second surface is used for mounting the beam body; a first angle is formed between the first surface and the second
(Continued)

surface, and a wing plate mounting space is formed between the first connecting portion and the second connecting portion.

20 Claims, 22 Drawing Sheets

Related U.S. Application Data which is a continuation-in-part of application No. 17/544,462, filed on Dec. 7, 2021, now Pat. No. 11,499,405, and a continuation-in-part of application No. 17/370,856, filed on Jul. 8, 2021, now Pat. No. 11,608,726, said application No. 17/544,462 is a continuation-in-part of application No. PCT/CN2019/107026, filed on Sep. 20, 2019.

(30) Foreign Application Priority Data

| Jun. 4, 2021 | (CN) | .................... 202110625071.0 |
| Sep. 17, 2021 | (CN) | .................... 202111094887.1 |
| Oct. 24, 2022 | (CN) | .................... 202222799624.7 |

(51) Int. Cl.
  *F01D 15/10* (2006.01)
  *F04B 17/06* (2006.01)

(58) Field of Classification Search
  CPC .... F05D 2220/76; F05D 2240/90; F02C 7/20; F02C 6/00; F02C 7/26
  See application file for complete search history.

(56) References Cited

U.S. PATENT DOCUMENTS

| 3,400,609 | A | 9/1968 | Utter |
| 3,418,485 | A | 12/1968 | Anderson et al. |
| 3,791,682 | A | 2/1974 | Mitchell |
| 3,881,841 | A | 5/1975 | Straniti |
| 4,341,071 | A | 7/1982 | Abo et al. |
| 5,435,975 | A | 7/1995 | Bastos |
| 5,517,822 | A | 5/1996 | Haws et al. |
| 5,709,076 | A | 1/1998 | Lawlor |
| 6,230,481 | B1 | 5/2001 | Jahr |
| 6,446,425 | B1 | 9/2002 | Lawlor |
| 7,028,461 | B2 | 4/2006 | Goi |
| 7,036,318 | B1 | 5/2006 | Munson, Jr. |
| 7,506,574 | B2 | 3/2009 | Jensen et al. |
| 7,552,903 | B2 | 6/2009 | Dunn et al. |
| 7,845,413 | B2 | 12/2010 | Shampine et al. |
| 8,506,267 | B2 | 8/2013 | Gambier |
| 8,567,354 | B2 | 10/2013 | Kealy et al. |
| 8,621,873 | B2 | 1/2014 | Robertson et al. |
| 8,801,394 | B2 | 8/2014 | Anderson |
| 9,534,473 | B2 | 1/2017 | Morris et al. |
| 9,650,879 | B2 | 5/2017 | Broussard |
| 10,030,579 | B2 | 7/2018 | Austin et al. |
| 10,060,293 | B2 | 8/2018 | Del Bono |
| 10,371,012 | B2 | 8/2019 | Davis et al. |
| 10,815,764 | B1 | 10/2020 | Yeung |
| 10,895,202 | B1 | 1/2021 | Yeung et al. |
| 10,954,770 | B1* | 3/2021 | Yeung .................. E21B 43/267 |
| 10,961,993 | B1 | 3/2021 | Ji et al. |
| 10,968,837 | B1 | 4/2021 | Yeung et al. |
| 11,111,768 | B1 | 9/2021 | Yeung et al. |
| 11,181,046 | B1 | 11/2021 | Brooks et al. |
| 11,242,737 | B2 | 2/2022 | Zhang |
| 11,499,405 | B2 | 11/2022 | Zhang |
| 11,519,395 | B2 | 12/2022 | Zhang |
| 2003/0004029 | A1 | 1/2003 | Lagarde et al. |
| 2003/0171184 | A1 | 9/2003 | Wige |
| 2004/0050049 | A1 | 3/2004 | Wendt et al. |
| 2005/0221946 | A1 | 10/2005 | Mitrovic |
| 2007/0213171 | A1 | 9/2007 | Pizzichil et al. |
| 2007/0277982 | A1 | 12/2007 | Shampine et al. |
| 2009/0068031 | A1 | 3/2009 | Gambier et al. |
| 2010/0033148 | A1 | 1/2010 | Deldalle |
| 2010/0071899 | A1 | 3/2010 | Coquilleau et al. |
| 2011/0085924 | A1 | 4/2011 | Shampine et al. |
| 2011/0171044 | A1 | 7/2011 | Flanigan |
| 2013/0112029 | A1 | 5/2013 | Slayter et al. |
| 2013/0209236 | A1 | 8/2013 | Xu |
| 2014/0013768 | A1* | 1/2014 | Laing .................. F02C 7/20 60/796 |
| 2014/0144641 | A1 | 5/2014 | Chandler |
| 2014/0174717 | A1 | 6/2014 | Broussard et al. |
| 2014/0219824 | A1 | 8/2014 | Burnette |
| 2014/0274557 | A1 | 9/2014 | Chong |
| 2014/0322034 | A1 | 10/2014 | Bayyouk |
| 2015/0184591 | A1 | 7/2015 | Giancotti et al. |
| 2015/0247421 | A1 | 9/2015 | Wojick et al. |
| 2015/0252661 | A1 | 9/2015 | Glass |
| 2015/0275891 | A1 | 10/2015 | Chong |
| 2015/0377318 | A1 | 12/2015 | Byrne |
| 2015/0381013 | A1 | 12/2015 | Davies et al. |
| 2016/0047305 | A1 | 2/2016 | Wickert et al. |
| 2016/0102581 | A1 | 4/2016 | Del Bono |
| 2016/0169322 | A1 | 6/2016 | Ono |
| 2016/0177678 | A1 | 6/2016 | Morris et al. |
| 2016/0218650 | A1 | 7/2016 | Gajanayake et al. |
| 2016/0230525 | A1 | 8/2016 | Lestz et al. |
| 2016/0281484 | A1 | 9/2016 | Lestz et al. |
| 2016/0341124 | A1 | 11/2016 | Ross et al. |
| 2016/0348479 | A1 | 12/2016 | Oehring et al. |
| 2017/0023014 | A1 | 1/2017 | Clemen et al. |
| 2017/0082110 | A1 | 3/2017 | Lammers |
| 2017/0089189 | A1 | 3/2017 | Norris et al. |
| 2017/0104389 | A1 | 4/2017 | Morris et al. |
| 2017/0218727 | A1 | 8/2017 | Oehring et al. |
| 2017/0234308 | A1 | 8/2017 | Buckley |
| 2017/0292789 | A1 | 10/2017 | Hjorth et al. |
| 2018/0111807 | A1 | 4/2018 | Snider |
| 2018/0266412 | A1 | 9/2018 | Stokkevag et al. |
| 2018/0283464 | A1 | 10/2018 | Altamura |
| 2019/0063309 | A1 | 2/2019 | Davis |
| 2019/0067991 | A1 | 2/2019 | Davis et al. |
| 2019/0068026 | A1 | 2/2019 | Davis |
| 2019/0178235 | A1 | 6/2019 | Coskrey et al. |
| 2019/0338762 | A1 | 11/2019 | Curry et al. |
| 2020/0040878 | A1 | 2/2020 | Morris et al. |
| 2020/0049136 | A1 | 2/2020 | Stephenson |
| 2020/0056458 | A1 | 2/2020 | Mao et al. |
| 2020/0109616 | A1 | 4/2020 | Oehring et al. |
| 2020/0325761 | A1 | 10/2020 | Williams |
| 2020/0332784 | A1 | 10/2020 | Zhang et al. |
| 2020/0340344 | A1 | 10/2020 | Reckels et al. |
| 2020/0370633 | A1 | 11/2020 | Kumar |
| 2020/0392826 | A1 | 12/2020 | Cui et al. |
| 2021/0025383 | A1 | 1/2021 | Bodishbaugh |
| 2021/0079902 | A1 | 3/2021 | Yeung et al. |
| 2021/0102531 | A1 | 4/2021 | Bodishbaugh et al. |
| 2021/0372256 | A1 | 12/2021 | Yeung et al. |
| 2021/0381358 | A1 | 12/2021 | Yeung |
| 2021/0404309 | A1 | 12/2021 | Yeung et al. |
| 2022/0259964 | A1 | 8/2022 | Zhang |

FOREIGN PATENT DOCUMENTS

| CN | 201159100 Y | 12/2008 |
| CN | 201646518 U | 11/2010 |
| CN | 201863895 U | 6/2011 |
| CN | 102136778 A | 7/2011 |
| CN | 102602323 A | 7/2012 |
| CN | 202673269 U | 1/2013 |
| CN | 202763319 U | 3/2013 |
| CN | 202926404 U | 5/2013 |
| CN | 202935216 U | 5/2013 |
| CN | 203962367 U | 11/2014 |
| CN | 105065224 A | 11/2015 |
| CN | 205117343 U | 3/2016 |
| CN | 105545666 A | 5/2016 |

(56) References Cited

FOREIGN PATENT DOCUMENTS

| | | |
|---|---|---|
| CN | 105703535 A | 6/2016 |
| CN | 106089175 A | 11/2016 |
| CN | 107208557 A | 9/2017 |
| CN | 107544304 A | 1/2018 |
| CN | 107939342 A | 4/2018 |
| CN | 208862781 U | 5/2019 |
| CN | 109869294 A | 6/2019 |
| CN | 109882144 A | 6/2019 |
| CN | 109906305 A | 6/2019 |
| CN | 107461253 B | 8/2019 |
| CN | 110118127 A | 8/2019 |
| CN | 110145399 A | 8/2019 |
| CN | 110374745 A | 10/2019 |
| CN | 110469314 A | 11/2019 |
| CN | 110469405 A | 11/2019 |
| CN | 110500255 A | 11/2019 |
| CN | 110513097 A | 11/2019 |
| CN | 209586278 U | 11/2019 |
| CN | 209586287 U | 11/2019 |
| CN | 110735713 A | 1/2020 |
| CN | 110821464 A | 2/2020 |
| CN | 210714958 U | 6/2020 |
| CN | 210985525 A | 7/2020 |
| CN | 111594314 A | 8/2020 |
| CN | 111946504 A | 11/2020 |
| CN | 112343676 A | 2/2021 |
| CN | 112682172 A | 4/2021 |
| DE | 102015213625 A1 | 1/2017 |
| FR | 2890438 A1 | 3/2013 |
| KR | 101861753 B1 | 5/2018 |
| WO | WO 2019/204323 A1 | 10/2019 |

OTHER PUBLICATIONS

International Search Report, dated Jun. 5, 2020, pp. 1-4, issued in International Patent Application No. PCT/CN2019/107020, China Intellectual Property Administration, Beijing, China.

International Search Report, dated Jun. 5, 2020, pp. 1-4, issued in International Patent Application No. PCT/CN2019/107021, China Intellectual Property Administration, Beijing, China.

International Search Report, dated Jun. 10, 2020, pp. 1-4, issued in International Patent Application No. PCT/CN2019/107023, China Intellectual Property Administration, Beijing, China.

International Search Report, dated May 14, 2020, pp. 1-4, issued in International Patent Application No. PCT/CN2019/107026, China Intellectual Property Administration, Beijing, China.

International Search Report, dated Sep. 26, 2021, pp. 1-4, issued in International Patent Application No. PCT/CN2019/095646, China Intellectual Property Administration, Beijing, China.

Office Action issued in U.S. Appl. No. 18/509,683 dated Aug. 20, 2024.

* cited by examiner

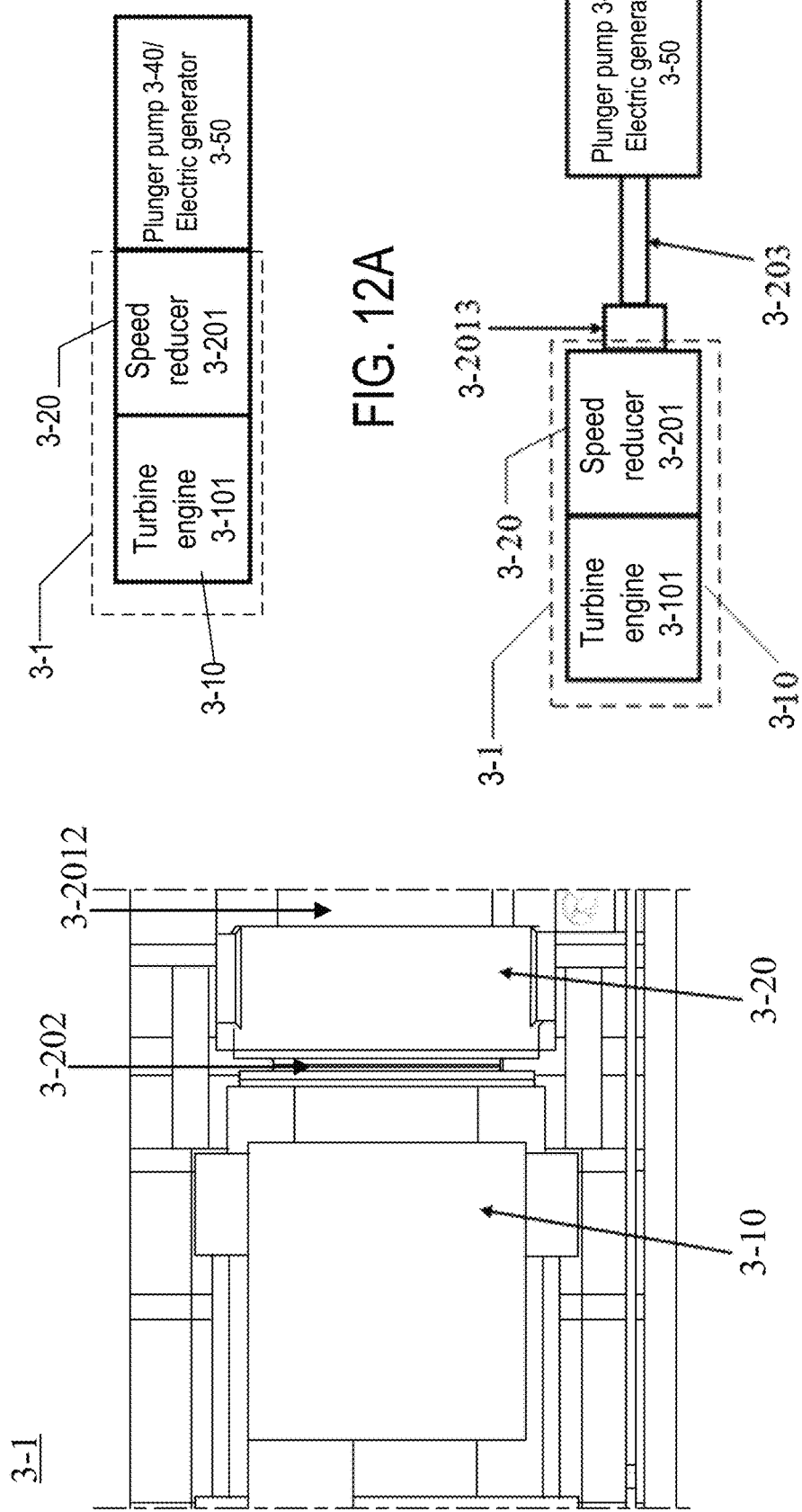

CONNECTING STRUCTURE, PLUNGER PUMP DEVICE AND GENERATOR DEVICE

CROSS REFERENCE

This patent application is based on and claims the benefit of priority to Chinese Patent Application No. 202222799624.7 filed on Oct. 24, 2022. This patent application is further a continuation-in-part application and claims the benefit of priority to U.S. patent application Ser. No. 17/735,826 filed on May 3, 2022, which is a continuation-in-part application of and claims priority to U.S. patent application Ser. No. 17/370,856, filed on Jul. 8, 2021, which is based on and claims priority to Chinese Patent Application Nos. 202110030394.5 and 202110360761.8, filed on Jan. 11, 2021 and Apr. 2, 2021, respectively. U.S. patent application Ser. No. 17/735,826 is further based on and claims priority to Chinese Patent Application No. 202111094887.1 filed on Sep. 17, 2021 and Chinese Patent Application No. 202110625071.0 filed on filed on Jun. 4, 2021. U.S. patent application Ser. No. 17/735,826 additionally claims priority to U.S. patent application Ser. No. 17/544,462 filed on Dec. 7, 2021, which is based on International PCT Patent Application No. PCT/CN/2019/107026, filed on Sep. 20, 2019. The entireties of these prior U.S., Chinese, and PCT patent applications are herein incorporated by reference as part of the present disclosure.

TECHNICAL FIELD

The disclosure relates to a technical field of plunger pumps, and in particular to a connecting structure, a plunger pump device and a generator device, and mobile and adaptive power generation systems and methods based on gas turbine engine for supplying mechanical and/or electrical power for fracturing operations at an oil wellsite.

BACKGROUND

Currently, a plunger pump is generally provided on a matching plunger pump base, and the plunger pump base is connected with a semi-trailer main beam by welding, to fix the plunger pump on the semi-trailer main beam while ensuring the working performance of the plunger pump.

However, the welding connection manner causes the plunger pump base to be unable to be detached, and reconfiguring a dedicated base increases the mounting costs of the plunger pump, and use of a universal base affects the working performance of the plunger pump. In addition, the welding process is equivalent to performing "heat treatment" on the semi-trailer main beam, which has a certain effect on the strength of the main beam and the whole vehicle.

SUMMARY

Some embodiments of the disclosure provide a connecting structure, a plunger pump device and a generator device, so as to solve a problem in an art known to inventors that the poor mounting and detachment flexibility of a plunger pump base.

Some embodiments of the present disclosure provide a connecting structure, for connecting a bottom and a beam body; wherein the beam body comprises a beam main body and a wing plate, the connecting structure includes: a connecting body which comprises a first connecting portion and a second connecting portion which are connected with each other, wherein the first connecting portion includes a first surface, the second connecting portion includes a second surface, the first surface is configured to mount the bottom, and the second surface is configured to mount the beam main body; a first angle is formed between the first surface and the second surface, and a wing plate mounting space is formed between the first connecting portion and the second connecting portion.

In some embodiments, the first surface is a flat surface; or the second surface is a flat surface; or each of the first surface and the second surface is a flat surface.

In some embodiments, the first surface includes a first through hole, and a first fastener pass through the first through hole and the bottom, to connect the bottom and the connecting structure; or, the second surface has a second through hole, and a second fastener pass through the second through hole and the beam main body, to connect the beam main body and the connecting structure; or the first surface includes a first through hole, and a first fastener pass through the first through hole and the bottom to connect the bottom and the connecting structure; the second surface includes a second through hole, and a second fastener pass through the second through hole and the beam main body to connect the beam main body and the connecting structure.

In some embodiments, the second connecting portion includes: a first plate body; a second plate body; and a third plate body, disposed opposite the first plate body, the first plate body being connected with the third plate body by the second plate body, a second angle being formed between the first plate body and the second plate body, and a third angle being formed between the second plate body and the third plate body; the plate surface of the second plate body away from the first plate body is the second surface; wherein the first connecting portion is a fourth plate body, the first plate body, the second plate body, the third plate body and the fourth plate body enclose to form an opening, the opening is the wing plate mounting space, the first plate body and the third plate body are both connected with a plate surface of the fourth plate body, and a plate surface of the fourth plate body away from the first plate body is the first surface.

In some embodiments, an end face of the first plate body away from the second plate body is a first inclined surface; or an end face of the third plate body away from the second plate body is a second inclined surface; or an end face of the first plate body away from the second plate body is a first inclined surface, and an end face of the third plate body away from the second plate body is a second inclined surface.

Some embodiments of the present disclosure provide a plunger pump device, comprising a plunger pump body, a connecting structure and a base, the plunger pump body being disposed on the base, and the base being disposed on a first surfaces of the connecting structure; the base has a bottom; wherein the connecting structure is the described connecting structure.

In some embodiments, the base includes: a base body, the plunger pump body and the connecting structures being respectively positioned at both sides of the base body; and a plurality of connecting members, the plurality of connecting members being disposed on the base body at intervals along a length direction of the base body, or the plurality of connecting members being disposed on the base body at intervals along a width direction of the base body; or one part of connecting members being disposed on the base body at intervals along a length direction of the base body, and the other part of connecting members being disposed on the base body at intervals along a width direction of the base body, and the plunger pump body being connected with the base body by the connecting members.

In some embodiments, the base body includes a first base body section, a second base body section, a third base body section and a fourth base body section which are connected in an end-to-end manner, the first base body section being disposed opposite the third base body section, and the second base body section being disposed opposite the fourth base body section; the base body has a third through hole and a fork avoidance slot, and a first fastener pass through the first through hole of the connecting structure and the third through hole, to connect the connecting structure and the base; wherein the third through hole is disposed on the first base body section; or the third through hole is disposed on the third base body section; or the third through hole is disposed on the first base body section and the third base body section; and the fork avoidance slot is disposed on the second base body section; or the fork avoidance slot is disposed on the fourth base body section; or the fork avoidance slot is disposed on the second base body section and the fourth base body section.

In some embodiments, the first surface is a flat surface; or the second surface is a flat surface; or each of the first surface and the second surface is a flat surface.

In some embodiments, the first surface includes a first through hole, and a first fastener pass through the first through hole and the bottom to connect the bottom and the connecting structure; or, the second surface includes a second through hole, and a second fastener pass through the second through hole and the beam main body to connect the beam main body and the connecting structure; or, the first surface includes a first through hole, and a first fastener pass through the first through hole and the bottom to connect the bottom and the connecting structure; the second surface includes a second through hole, and a second fastener pass through the second through hole and the beam main body to connect the beam main body and the connecting structure.

In some embodiments, the second connecting portion includes: a first plate body; a second plate body; and a third plate body, disposed opposite the first plate body, the first plate body being connected with the third plate body by the second plate body, a second angle being formed between the first plate body and the second plate body, and a third angle being formed between the second plate body and the third plate body; a plate surface of the second plate body away from the first plate body is the second surface; wherein the first connecting portion is a fourth plate body, the first plate body, the second plate body, the third plate body and the fourth plate body enclose to form an opening, the opening is the wing plate mounting space, the first plate body and the third plate body are both connected with a plate surface of the fourth plate body, and a plate surface of the fourth plate body away from the first plate body is the first surface.

In some embodiments, an end face of the first plate body away from the second plate body is a first inclined surface; or an end face of the third plate body away from the second plate body is a second inclined surface; or an end face of the first plate body away from the second plate body is a first inclined surface, and an end face of the third plate body away from the second plate body is a second inclined surface.

Some embodiments of the present disclosure provide a generator device, comprising a generator body, a connecting structure and a base, the generator body being disposed on the base, and the base being disposed on a first surface of the connecting structure; the base has a bottom; wherein the connecting structure is the described connecting structure.

In some embodiments, the first surface includes a first through hole, and a first fastener pass through the first through hole and the bottom to connect the bottom and the connecting structure; or, the second surface includes a second through hole, and a second fastener pass through the second through hole and the beam main body to connect the beam main body and the connecting structure; or, the first surface includes a first through hole, and a first fastener pass through the first through hole and the bottom to connect the bottom and the connecting structure; the second surface includes a second through hole, and a second fastener pass through the second through hole and the beam main body to connect the beam main body and the connecting structure.

In some embodiments, the second connecting portion includes: a first plate body; a second plate body; and a third plate body, disposed opposite the first plate body, the first plate body being connected with the third plate body by the second plate body, a second angle being formed between the first plate body and the second plate body, and a third angle being formed between the second plate body and the third plate body; a plate surface of the second plate body away from the first plate body is the second surface; wherein the first connecting portion is a fourth plate body, the first plate body, the second plate body, the third plate body and the fourth plate body enclose to form an opening, the opening is the wing plate mounting space, the first plate body and the third plate body are both connected with a plate surface of the fourth plate body, and a plate surface of the fourth plate body away from the first plate body is the first surface.

In some embodiments, an end face of the first plate body away from the second plate body is a first inclined surface; or an end face of the third plate body away from the second plate body is a second inclined surface; or an end face of the first plate body away from the second plate body is a first inclined surface, and an end face of the third plate body away from the second plate body is a second inclined surface.

Some embodiments of the present disclosure provide a generator device, comprising a generator body and a connecting structure, the generator body being disposed on a first surface of the connecting structure; the part where the generator body is connected with the first surface is a bottom; wherein the connecting structure is the described connecting structure.

In some embodiments, the first surface includes a first through hole, and a first fastener pass through the first through hole and the bottom to connect the bottom and the connecting structure; or, the second surface includes a second through hole, and a second fastener pass through the second through hole and the beam main body to connect the beam main body and the connecting structure; or, the first surface includes a first through hole, and a first fastener pass through the first through hole and the bottom to connect the bottom and the connecting structure; the second surface includes a second through hole, and a second fastener pass through the second through hole and the beam main body to connect the beam main body and the connecting structure.

In some embodiments, wherein the second connecting portion includes: a first plate body; a second plate body; and a third plate body, disposed opposite the first plate body, the first plate body being connected with the third plate body by the second plate body, a second angle being formed between the first plate body and the second plate body, and a third angle being formed between the second plate body and the third plate body; a plate surface of the second plate body away from the first plate body is the second surface; wherein the first connecting portion is a fourth plate body, the first plate body, the second plate body, the third plate body and the fourth plate body enclose to form an opening, the opening is the wing plate mounting space, the first plate body and the third plate body are both connected with a plate surface of the fourth plate body, and a plate surface of the fourth plate body away from the first plate body is the first surface.

In some embodiments, wherein an end face of the first plate body away from the second plate body is a first inclined surface; or an end face of the third plate body away from the second plate body is a second inclined surface; or an end face of the first plate body away from the second plate body is a first inclined surface, and an end face of the third plate body away from the second plate body is a second inclined surface.

Applying the technical solution of this disclosure, a bottom is connected with a beam body by connecting structures, and a connecting body of each connecting structure includes a first connecting portion and a second connecting portion which are connected with each other, and a wing plate mounting space is formed between the first connecting portion and the second connecting portion, so as to avoid a wing plate of the beam body, and ensure that the connecting structures can be disposed on the beam body; wherein a first surface of the first connecting portion is used for mounting the bottom, and a second surface of the second connecting portion is used for mounting the beam main body, the first connecting portion and the second connecting portion are arranged at a first angle, to connect the bottom and the beam body in different directions. In this way, both the first connecting portion and the bottom, and the second connecting portion and the beam body are detachably connected, so that working personnel detaches the bottom from the beam body, thereby solving the problem in an art known to inventors that the poor mounting and detachment flexibility of a plunger pump base, and reducing the mounting and detachment costs of a plunger pump.

Compared with the method of connecting a beam body and a plunger pump base by welding in the art known to inventors, in the present disclosure, the bottom is detachably connected with the beam body by means of connecting structures, which, on the one hand, reduces the mounting difficulty and labor intensity of working personnel, and on the other hand, makes the bottom detachable from the beam body, thereby effectively improving the flexibility of mounting and detachment of the bottom, and also facilitating replacement of the bottom by working personnel.

BRIEF DESCRIPTION OF THE DRAWINGS

The drawings of the description, constituting a part of the present disclosure, are used for providing further understanding of the disclosure and the illustrative embodiments of the disclosure and illustrations thereof are used to explain the disclosure, rather than constitute inappropriate limitation on the disclosure. In the drawings:

FIG. 11 shows a structural schematic diagram of an example fracturing and electric power generation switchable system as provided according to embodiment of the present disclosure.

FIG. 12A shows a schematic block diagram of an example fracturing and electric power generation switchable system as provided according to an embodiment of the present disclosure.

FIG. 12B shows a schematic block diagram of another example fracturing and electric power generation switchable system as provided according to an embodiment of the present disclosure.

DETAILED DESCRIPTION OF THE EMBODIMENTS

Figure 2:
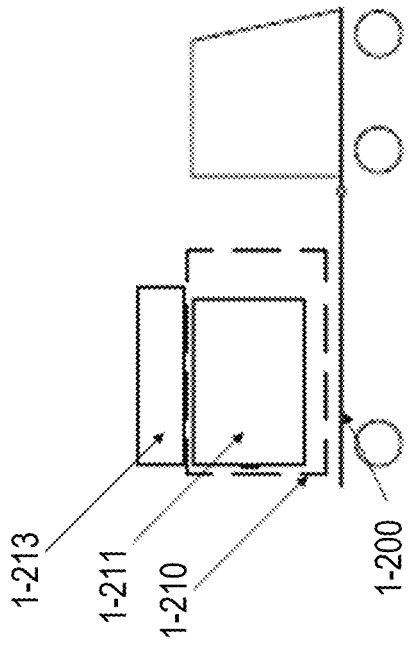
FIG. 2 shows a schematic structural diagram of another example mobile power platform as provided according to an embodiment of the present disclosure

It is to be noted that embodiments of the present disclosure and features in the embodiments can be combined with each other without conflicts. Hereinafter, the present disclosure is described in detail with reference to the accompanying drawings and in conjunction with the embodiments.

It is to be noted that unless otherwise indicated, all technical and scientific terms used in the present application have the same meanings as those commonly understood by one of ordinary skill in the art to which the present disclosure belongs.

In the present disclosure, unless specified to the contrary, the directional terms such as "upper and lower" are generally used regarding the directions shown in the figures, or regarding vertical, perpendicular, or gravity directions; likewise, for ease of understanding and description, "left and right" is generally regarding left and right as shown in the figures; and "inner and outer" refers to the inner and outer relative to the outline of each component itself, but the described directional terms are not used to limit the present disclosure.

In order to solve the problem in an art known to inventors that the poor mounting and detachment flexibility of a plunger pump base, the present disclosure provides a connecting structure, a plunger pump device and a generator device.

A gas turbine may include an internal combustion engine that converts chemical energy of a fuel into mechanical energy in the form of rotational power that can be further utilized to power various loads, including but not limited to mechanical loads such as hydraulic pumps and electric loads such as electric generators. The advantages of gas turbines include small footprint, compactness, high reliability, low operating costs and high-power density. Gas turbines can also run on cleaner energy sources than, e.g., diesel engines, thereby reducing carbon emissions and air pollution.

A gas turbine, for example may include an intake end for delivering combustion air and an exhaust end for releasing combustion exhaust. Fuels may be directed into a combustion chamber of the gas turbine to mix with the combustion air via fuel injection lines. The gas turbine may further include a mechanical rotational power output for driving a load. The power output of a gas turbine is usually at a high rotational speed.

In some applications, gas turbines may be used to drive both mechanical loads and electric power generators. For example, in an oil well site employing hydraulic fracturing operations, gas turbines may be used to drive both hydraulic pumps and electric generators. The hydraulic pumps such as plunger pumps may be operated to deliver higher pressure fracturing fluid to a wellhead of the wellsite whereas the electric generators may be configured to provide electric power to components of the entire power system and other components of the wellsite. It is desirable that the entire power system be adaptive, mobile, and convenient reconfigurable, as these systems are often move from well site to well site having different power requirement and characteristics.

In this disclosure, various systems, platforms, components, devices, and methods are provided for flexibly and adaptively configure one of more gas turbines, hydraulic pumps, and electric generators to support both fracturing and electric demands at a well site. The disclosed implementations enable and facilitate a mobile, adaptive, and reconfigurable power system to provide both mechanical and electric power for hydraulic fracturing operation. The disclosed systems and platforms, however, may not be limited to fracturing application. The underlying principles generally apply to power generation and distribution to other types of applications and scenarios.

In some example implementations, a mobile power generation system is disclosed. The power generation system may include a first vehicle, a gas turbine, and an electric generator (alternatively referred to as a generator). The first vehicle may be provided with a first platform. A first casing may be provided on the first platform for hosting various power generation components. The gas turbine may be arranged in the first casing and may include a first input end and a first output end. The electric generator may be arranged in the first casing and may include a second input end and a second output end, wherein the first output end of the gas turbine may be connected with the second input end of the electric generator.

Figure 1:
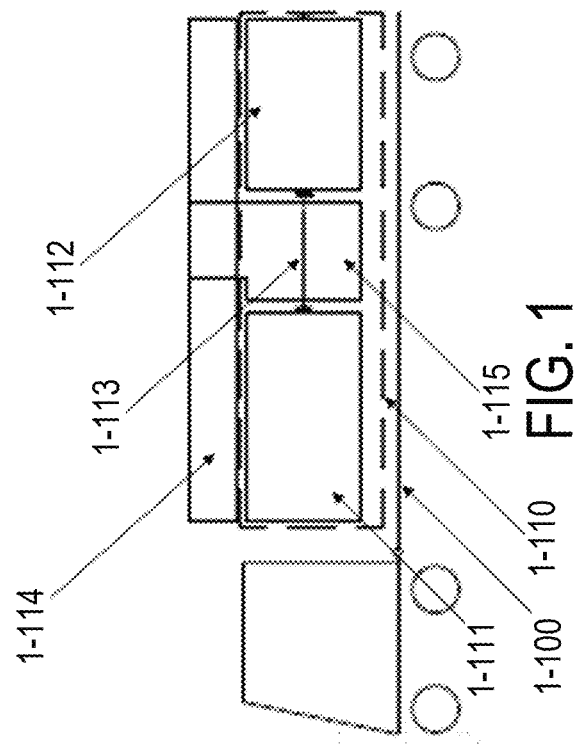
FIG. 1 shows a schematic structural diagram of an example mobile power platform as provided according to an embodiment of the present disclosure.

The example mobile power generation system is shown in FIG. 1. As illustrated in FIG. 1, the example mobile power generation system may include a gas turbine 1-111. The gas turbine 1-111 may be alternatively referred to as gas turbine engine, turbine, or turbine engine. The power output port of the gas turbine 1-111 may be detachably connected to an electric generator 1-211 shown in FIG. 2. The electric generator 1-211 may be alternatively referred to as a generator. When in use, the gas turbine 1-111 outputs rotational kinetic energy to drive the generator 1-211 to generate electricity, and to deliver a power output through the generator 1-211.

As further shown in FIG. 1, the gas turbine 1-111 may be fixedly connected to the first platform 1-100. The first platform 1-100 may be a semi-trailer or a portion of a semi-trailer. A first casing 1-110 may be fixedly connected to the semi-trailer or integrated with the semi-trailer, and the gas turbine 1-111 may be disposed in the first casing 1-110. The first casing 1-110, may be alternatively referred to as a first housing. A gear box 1-112 may be detachably connected to a location relative to the semi-trailer corresponding to the output end of the gas turbine 1-111. In some example implementations, the gear box 1-112 may be disposed within the first casing 1-110. The gear box 1-112 may include a mounting surface, an input port, and an output port. The gear box 1-112, for example, may fixedly connected, using bolts and the like, to the semi-trailer platform 1-100 through the mounting surface, and further through the first casing 1-110 when the gear box 1-112 is disposed within the first casing 1-110. The output end of the gas turbine 1-111 may be detachably connected with one end of a first coupling 1-113, and another end of the first coupling 1-113 away from the gas turbine 1-111 may be detachable connected to the input end of the gearbox 1-112. The detachable connection of the first coupling 1-113 to the output end of the turbine engine and/or the input port of the gear box 1-112 may be achieved via a set of bolts or splines. A first shaft hole may be formed on the side wall of the first casing 1-110 corresponding to the output end of the gear box 1-112 for outputting power from the gear box 1-112 to the outside of the first casing 1-110 (e.g., to the electric generator 1-211 of FIG. 2. The position on the first casing or housing 1-110 corresponding to the first shaft hole may be hingedly coupled to a cover capable of covering the first shaft hole, so as to open to receive a driving shaft when driving a load but to close the first shaft hole to prevent dust and other substances from entering the first casing or housing 1-110 when the gear box 1-112 is not connected to and driving any load. A first locking mechanism may be provided on the first end cover for securely closing the shaft hole, and the first locking mechanism may be based on any one of various locks such as padlocks and magnetic suction stations. During an operation of the gas turbine 1-111, the output speed or torque of the gas turbine 1-111 may be adjusted through the gearbox 1-112 to a desired level to effectively match the characteristics of the load. For example, the gas turbine 1-111 may rotate at a high speed and a rational speed reduction may be provided by the gear box for driving a load at a lower rotational speed (and, e.g., a higher torque).

A central axis of the gas turbine 1-111 may be arranged along the length direction of the semi-trailer, and the output end of the gas turbine 1-111 may be arranged toward the rear of the semi-trailer. Both a central axis of the input end and a central axis of the output end of the gearbox 1-112 may be parallel to the central axis of the gas turbine 1-111. For example, the central axis of the input end of the gearbox 1-112 may be colinear with the central axis of the gas turbine 1-111. The central axis of the output end of the gear box 1-112, however, may or may not be colinear with the central axis of the input end of the gear box 1-112. In other words, the central axis of the output end of the gear box 1-112 may be parallelly shifted from the central axis of the input end of the gear box 1-112. The term "central axis," for example, may refer to a corresponding rotational axis. The output end of the gearbox 1-112 may be disposed toward the rear of the semi-trailer.

In some example implementations as shown in FIG. 1, an exhaust channel may be disposed between the gas turbine 1-111 and the gear box 1-112 of the semi-trailer. The exhaust channel 1-115 may be detachably connected to the semi-trailer through, for example, the first casing or housing 1-110 and/or the platform 1-100 of the semi-trailer. For example, the exhaust channel includes a volute or other structure, which can be connected to the semi-trailer or removed from the semi-trailer by means of bolting or unbolting. When connecting a volute to the gas turbine 1-111, the volute can be connected to the exhaust end of the gas turbine 1-111 by means of flanges and the like for convenient assembly and disassembly. The end of the volute away from the gas turbine 1-111 may protrude out of the first casing 1-110. Correspondingly, the first casing 1-110 may be provided with an opening for releasing turbine combustion exhaust. When the gas turbine 1-111 is in operation, the volute can guide the exhaust gas discharged from the gas turbine 1-111 away from the gas turbine 1-111 through the pipes or channels therein, so as to reduce the probability that the exhaust gas being inhaled into the gas turbine 1-111 through its air intake port.

The first casing or housing 1-110 may be further provided with a disassembly opening at a position corresponding to one side of the volute. The cross-sectional area of the disassembly opening may be larger than that of the volute, and may thus allow the volute to pass through the disassembly opening.

The provision of the disassembly opening thus may facilitate the operator to install the volute via the disassembly opening or disassemble it from the semi-trailer via the disassembly opening or disassembly port. A cavity may be formed in the volute for the first coupling 1-113 to pass through. The exhaust channels or pipes in the volute thus may be constructed to go around the cavity. During assembly, the volute may be fixed on the semi-trailer first, and then the first coupling 1-113 may be installed by inserting it through the cavity and the two ends of the first coupling 1-113 may then be respectively attached to the gas turbine 1-111 and the gearbox 1-112, as described above, to complete the driving connection or coupling between the gas turbine 1-111 and the gearbox 1-112.

The end of the volute away from the gas turbine 1-111 may be further detachably connected with an auxiliary exhaust passage. The auxiliary exhaust passage, for example, can be a pipe or a cylindrical structure. The auxiliary exhaust passage may be connected to the volute through flanges or bolts to guide the exhaust gas further away from the gas turbine 1-111.

Figure 3:
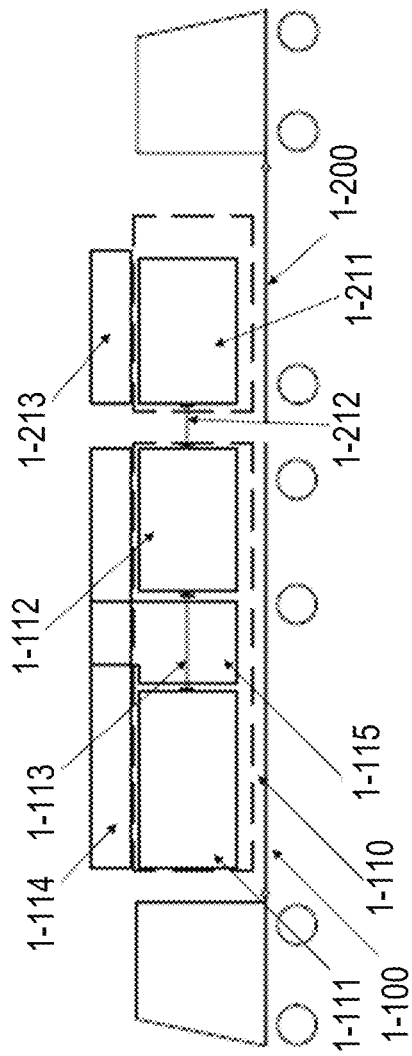
FIG. 3 shows a schematic structural diagram of an example mobile power platform combining the example mobile power platforms of FIG. 1 and FIG. 2 according to an embodiment of the present disclosure.

In some implementations, as shown in FIGS. 1 and 3, a first intake passage 1-114 may be fixedly connected and disposed above the first casing 1-110 for air intake to the gas turbine 1-111. The first intake passage 1-114 may be provided with an intake port at a position corresponding to at least one side of the semi-trailer, and located near the gas turbine 1-111. In some implementations, multiple intake ports may be disposed with the intake passage 1-114 and may be located on two sides of the demi-trailer. The intake passage 1-114 may be connected to the intake end of the gas turbine 1-111. The connection may be through the first casing 1-110. Alternatively, the intake end of the gas turbine 1-111 may extrude out of the first casing 1-110 and in connection with the intake passage for the intake air to flow into the intake end of the gas turbine.

As further shown in FIG. 2, the electric generator 1-211 may be disposed on a second platform 1-200. The second platform 1-200 may be formed by a portion of a vehicle, semi-trailer, or trailer. A second casing or housing 1-210 may be provided either as an integral part of the vehicle or an add-on fixedly connected to the vehicle. The generator 1-211 may be accordingly disposed in the second casing 1-210. The second casing or housing 1-210 may be provided with a second shaft hole at a position corresponding to the input end of the generator 1-211 for allowing rotational power to be transmitted or delivered to the input end of the generator 1-211 through a shaft. The second shaft hole in the second casing or housing 1-210 may be provided with a second cover hingedly connected with the second casing. The second cover may be capable of covering the second shaft hole, so as to close the second shaft hole and prevent dust from entering when the electric generator is not connected to the gas turbine and is not in use. A second locking mechanism may be provided on the second end cover with the second casing 1-210, and the second locking mechanism may be implemented as any one of various types of locks such as padlocks and magnetic suction stations.

In some example implementations, an electric output end of the electric generator 1-211 may be disposed toward the rear or front of the vehicle body shown in FIG. 2. The output of the electric generator 1-211 may be electrically connected to any suitable load, such as an electric motor. The electric motor may be used to supply electrical power need for the fracturing operation. In some implementations, the electric motor may be used for driving a plunger pump for pumping hydraulic fracturing fluid.

As further shown in FIG. 2, a second intake passage 1-213 may be fixedly disposed on the second housing 1-210 at a position above the generator 1-211. The second intake passage 1-213 may include a pipe or a box with an opening. Air may flow into the second casing or housing 1-210 via the second intake passage, so as to achieve circulation of cooling air for the electric generator 1-211 when in operation.

Referring to FIG. 3, when using the above gas-turbine system for driving the electric generator system, the semi-trailer hosting the gas-turbine system of FIG. 2 may be parked at a fixed location or position, and the vehicle body hosting electric generator system may be reversed until the rear of the semi-trailer aligns to the rear of the vehicle body. At this time, a second coupling 1-212 can be used to line the gas-turbine 1-111 and the electric generator 1-211 for the gas turbine 1-111 to drive the electric generator 1-211 through the gear box 1-112 to produce electricity. The electric generator 1-211 may be connected with the gear box 1-112, and the manner in which the two ends of the second coupling 1-212 are connected to the gear box 1-112 and the electric generator 1-211 may be similar to that used for the first coupling 1-113 of FIG. 1 for connecting the output end of the gas turbine 1-111 and the gear box 1-112. Under such a configuration, the rotational power from the gas turbine when in operation can be transmitted from the first casing 1-110 to the second casing 1-210 through the second coupling 1-212, so as to realize electricity generation by the electric generator 1-211.

The rear of the semi-trailer and the rear of the vehicle body above may be further connected by one or more coupled flanges, so as to keep the relative position and orientation of the vehicle body and the semi-trailer sufficiently fixed and stable.

The end faces of the first air inlet passage 1-114 and the second air inlet passage 1-213 may also be aligned when the vehicle body and demi-trailer are coupled for electricity generation. For example, the air inlet passage 1-114 for the gas turbine and the air inlet passage 1-213 for the electric generator may be close and may butt up against each other at these ends and. they may be provided with connection mechanisms for connecting these ends. For example, the connection mechanisms may utilize connection flanges. The connection between the first intake passage 1-114 and the second intake passage 1-213 may help further stabilize the position and orientation between the vehicle body and the semi-trailer.

This implementation of the gas turbine system and the electric generator system may be provided according to an example method, including the steps of:

S1: Reverse the vehicle body and semi-trailer to align the rear of the vehicle body and the rear of the semi-trailer, and connect the vehicle body and the semi-trailer, for example, through the flanges described above;

S2: Connect the first intake passage 1-114 and the second intake passage 1-213, for example through using flanges described above;

S3: Place the volute described above into the first casing or housing 1-110 at the disassembly opening or port and fix or attach it on the first platform 1-100;

S4: Connect the gas turbine 1-111 and the generator 1-211.

The step S4 may specifically include the following steps:

S4-1: Connect the gearbox 1-112 and the gas turbine 1-111 through the first coupling 1-113, wherein the first coupling 1-113 passes through the cavity formed around the first exhaust passage 1-115, as described above;

S4-2: connect the gearbox 1-112 and the generator 1-211 through the second coupling 1-212;

S4-3: Connect the second intake passage 1-213 and the first intake passage 1-114.

Through the above assembly or installation steps, the relative position and orientation of the generator 1-211 and the gas turbine 1-111 can be determined through the connection between the vehicle body and the semi-trailer and the connection between the first air intake passage 1-114 and the second air intake passage 1-213 before the power output connection. The process above to fix and connect the various components results in stable relative position and orientation of these components, so that when the second coupling 1-212 is connected between the gear box 1-112 and the electric generator 1-211, the alignment accuracy during connection can be effectively improved or maintained, and the probability and extent of equipment wear may be reduced.

The implementations above in relation to FIGS. 1-3 provides a flexible configuration of mobile units containing turbine power source and electric generator that can be flexibly combined and installed. As such, the turbine power source may be used and alternatively configured to power other components at a well site rather than being dedicated to the electric generator.

In some other example implementations, rather than separating the gas turbine system and the electric power generation system into two separate mobile platform (or vehicles) and connecting them prior to operation, the two systems may be disposed on one integral mobile platform. By arranging the gas turbine and the electric generator in the same vehicle or mobile platform, the relative positions of the gas turbine and the generator may be fixed via common platform and/or casing and a simple and stable connection/coupling therebetween. Replacement and installation procedures are simplified. The combined system can be mobile and thus can be conveniently moved from well site to well site or from one location of a well site to another location on a same transportation platform. Such implementations may be suitable to some well sites depending on their operating characteristics.

Figure 4:
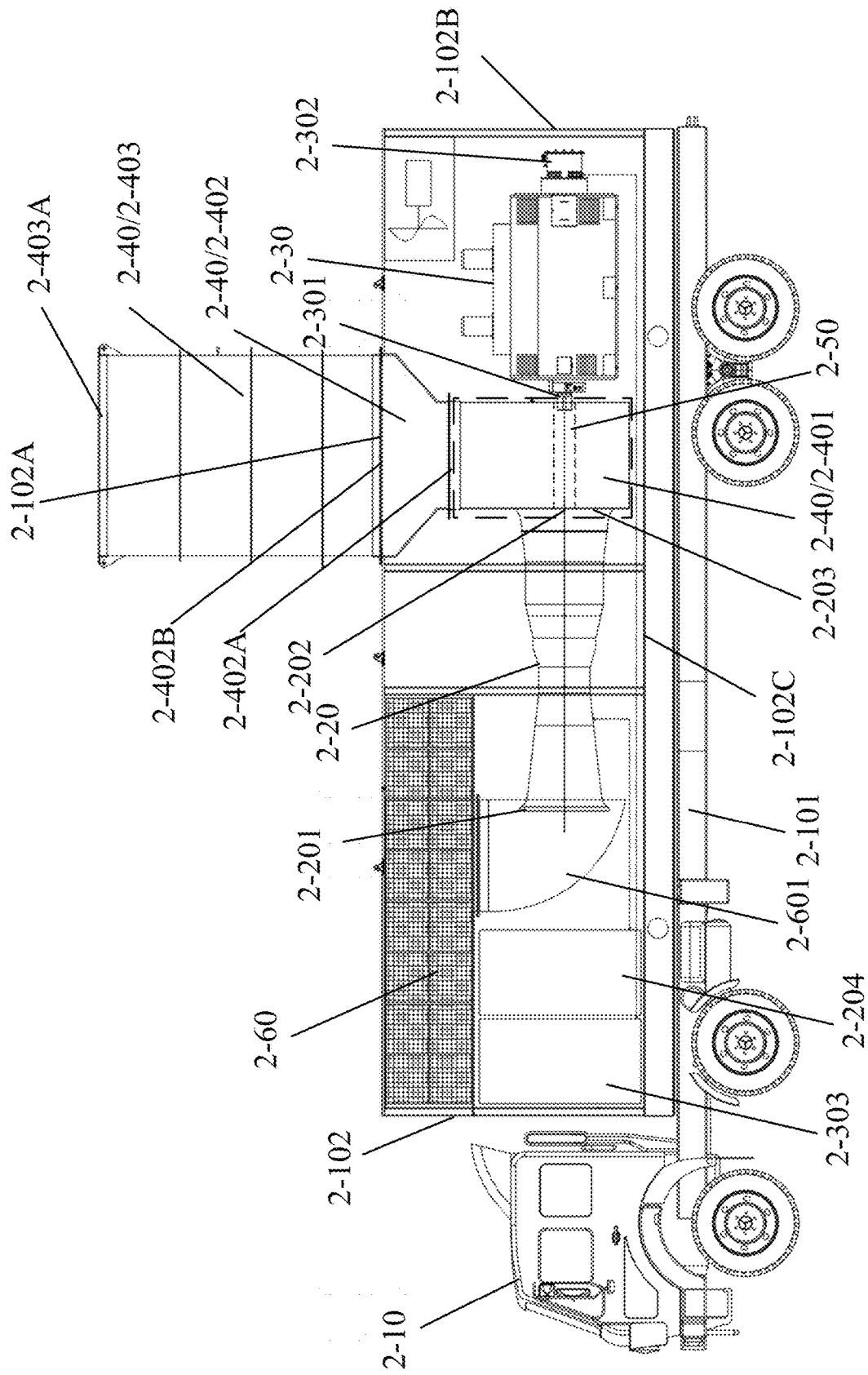
FIG. 4 shows a side view of an example mobile electric power generation system as provided according to an embodiment of the present disclosure.
Figure 5:
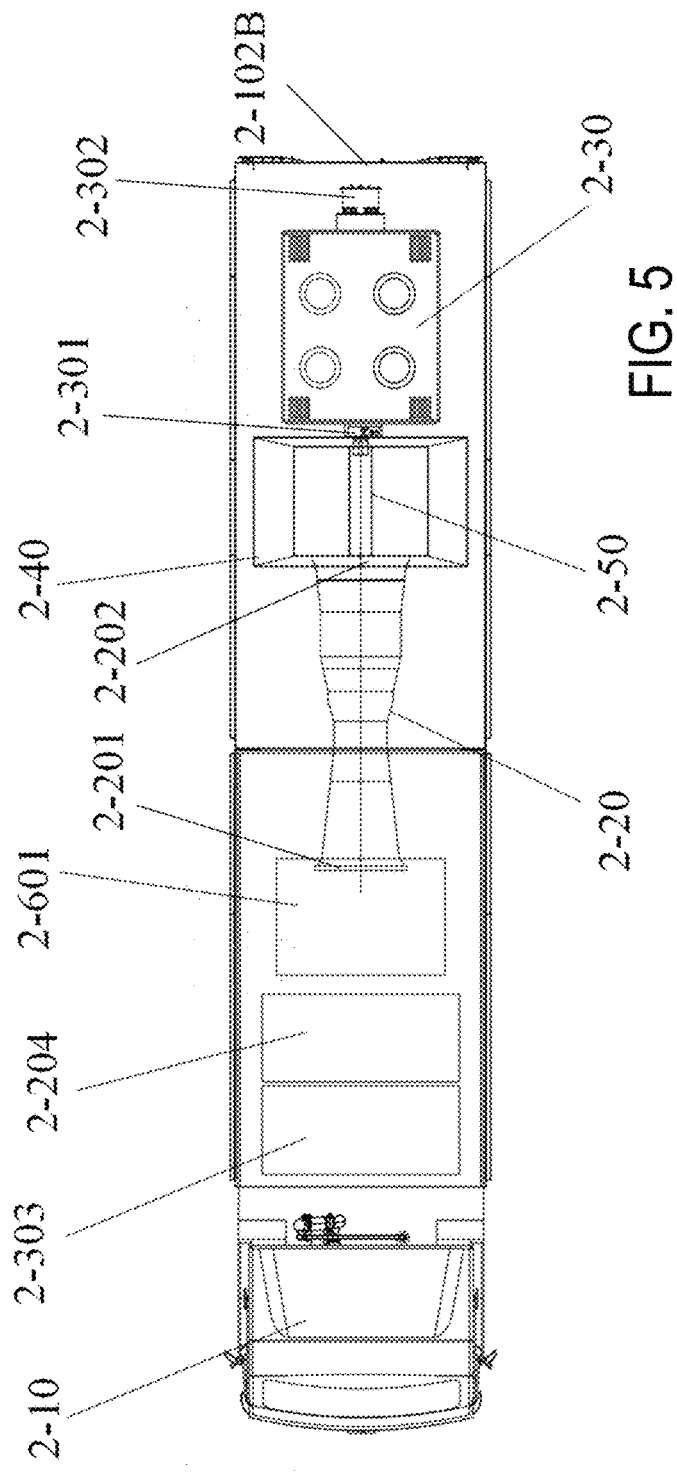
FIG. 5 shows a side view of the example mobile electric power generation system of FIG. 4 as provided according to an embodiment of the present disclosure.

For example, FIG. 4 shows a side view of such a power generation system with the gas turbine and electric generator arranged on a same mobile platform, whereas FIG. 5 shows a top view of the power generation system. Throughout disclosure, differentiation is not made between the term "system", "device", "equipment", and "apparatus". Unless otherwise specified, these terms are used interchangeably. As shown in FIG. 4 and FIG. 5, the power generation system may include a first vehicle 2-10, a gas turbine 2-20, a generator 2-30 and other devices/components. For example, the first vehicle 2-10 may include a first platform 2-101. A first casing 2-102 (alternatively referred to as a first housing 2-102) may be disposed on the first platform 2-101, and the gas turbine 2-20 may be disposed in the first casing 2-102 and may include a first input end 2-201 and a first output end 2-202. For example, the first input end 2-201 may include a fluid (e.g., combustion air) input end, and the first output end 2-202 may include a power output end for outputting rotational mechanical power.

For example, the generator 2-30 may be arranged in the first casing 2-102 and may also include a second input end 2-301 and a second output end 2-302. For example, the second input end 2-301 may be a power input end, and the second output end 2-302 may include an electric power output end for outputting electrical power. In some example implementations, the first output terminal 2-202 of the gas turbine 2-20 may be connected to the second input terminal 2-301 of the electric generator 2-30, so that the electric generator 2-30 can obtain the power output (e.g., rotational power) by the gas turbine 2-20 and convert the power into electrical output.

In the example embodiments shown in FIG. 4 and FIG. 5, the gas turbine and the generator are arranged in the same transportation means or vehicle, so that the gas turbine and the generator can be moved as a whole by a same transportation means to a location where power generation is needed. As such it becomes simple and convenient to use such a system as an integrated but mobile power generation system.

In some example implementations, the first means of transportation 2-10 may adopt at least one mobile platform including but not limited to a semi-trailer, a trailer, a truck, a skid, and a barge.

In addition, in the example embodiments of the present disclosure, by arranging the gas turbine and the generator in the same vehicle 2-10, the relative positions of the gas turbine and the electric generator can be fixable, so that the gas turbine and the electric generator can be stably connected through a simplified connection (e.g., simplified power connection), thereby avoiding repeated disassembly and installation.

In some example implementations, as shown in FIG. 4 and FIG. 5, the first output end 2-202 and the second input end 2-301 may be connected through a coupling 2-50 without using a mechanical device such as a gearbox for connection, which can simplify the Connection structure of the gas turbine and generator. In some other examples, the two ends of the coupling 2-50 may be detachably connected to the first output end 2-202 of the gas turbine 2-20 and the second input end 2-301 of the generator 2-30 through bolts or splines, respectively.

In some example implementations, as shown in FIGS. 4 and 5, the power generating system/device may further include an exhaust passage 2-40 disposed within the first casing 2-102 between the gas turbine 2-20 and the generator 2-30. For example, the gas turbine 2-20 may further include an exhaust end 2-203. The exhaust passage 2-40 may be connected with the exhaust end 2-203, for example, via flanges, for releasing exhaust gas of the gas turbine 2-20.

Figure 6:
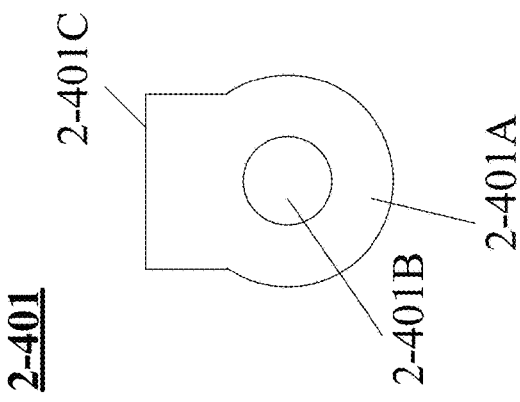
FIG. 6 shows a schematic structural diagram of a volute exhaust structure in a power generation system based on gas turbine as provided according to an embodiment of the present disclosure.

In some example implantations, as shown in FIG. 4, the exhaust passage 2-40 may include a volute exhaust structure 2-401 (portion shown by the dashed box). FIG. 6 shows a front view of an example volute exhaust structure 2-401. As shown by FIGS. 4, 5, and 6, the volute exhaust structure 2-401 may include an annular casing 2-401A. The annular casing 2-401A may include a central passage 2-401B and a first exhaust opening 2-401C. The coupling 2-50 may be arranged to pass through the central passage 2-401B to connect the gas turbine 2-20 to the electric generator 2-30. The first output end 2-202 of the gas turbine may be connected to the second input end 2-301 of the electric generator 2-30. Under such a configuration, the annular casing 2-401A would surround the coupling 2-50.

As a result, the volute exhaust structure 2-401 may form a channel for the coupling 2-50 to pass, and the volute exhaust structure 2-401 can assist in guiding and releasing the exhaust of the gas turbine 2-20 and at the same time facilitate the driving power connection between the gas turbine 2-20 and the electric generator 2-30. The overall connection configuration of the gas turbine 2-20 and the electric generator 2-30 is thus compactly arranged. The overall space occupied by the gas turbine 2-20, the exhaust passage 2-40, and the generator 2-30 may be reduced. A single casing may be used for easier transportation.

In some example implementations, the volute exhaust structure 2-401 may be connected to the first casing or housing 2-102 by means including but not limited to bolts. The first exhaust opening 2-401C of the volute exhaust structure 2-401 may be configured to face away from the first platform 2-101. For example, the volute exhaust structure 2-401C may face upward, as shown in the example of FIGS. 4 and 6. Such arrangement may facilitate a release of the exhaust gas discharged from the gas turbine 2-20 to a location further away from the power generation system and help prevent the exhaust gas from immediate circulation back to the power generation system and from inadvertently affecting the operating environment around the first vehicle 2-10.

In some example implementations, as shown in FIGS. 4 and 5, the volute exhaust structure 2-401 and the generator 2-30 may be spaced apart, thereby preventing the exhaust heat in the volute exhaust structure 2-401 from affecting the operation of the electric generator 2-30 and causing adverse effects.

In some example implementations, as shown in FIG. 4, the exhaust passage 2-40 may further include an extended exhaust structure 2-402. The extended exhaust structure 2-402 may include opposite second exhaust openings 2-402A and third exhaust openings 2-402B. The second exhaust opening 2-402A may communicate with the first exhaust opening 2-401C. For example, the opening size of the second exhaust opening 2-402A and the first exhaust opening 2-401C may be substantially the same, thereby facilitating the connection of the second exhaust opening 2-402A and the first exhaust opening 2-401C. The opening size of the third exhaust opening 2-402B may be larger than that of the second exhaust opening 2-402A. For example, the third exhaust opening 2-402B may flush with the upper surface of the first casing or housing 2-102.

In some example implementations, as shown in FIG. 4, the exhaust passage 2-40 may further include an auxiliary exhaust structure 2-403 having a fourth exhaust opening 2-403A. The first housing 2-102 may be configured with opening 2-102A for installation of the exhaust passage. The auxiliary exhaust structure 2-403 may be detachably connected with the extended exhaust structure 2-402 through the installation opening 2-102A of the exhaust passage. For example, the fourth exhaust opening 2-403A may communicate with the third exhaust opening 2-402B, and the fourth exhaust opening 2-403A and the third exhaust opening 2-402B may have substantially the same opening size, thereby facilitating a passage from the fourth exhaust opening 2-403A to the third exhaust opening 2-402B. For example, the opening size of the exhaust passage installation opening 2-102A may be slightly larger than the opening size of the fourth exhaust opening 2-403A, so as to facilitate the installation and removal of the auxiliary exhaust structure 2-403.

In the example embodiments of the present disclosure above, the extended exhaust structure 2-402 may facilitate the connection between different passage sizes or diameters. By designing the opening size of the third exhaust opening 2-402B to be larger than the opening size of the second exhaust opening 2-402A, the entire exhaust passage 2-40 is enlarged towards the exhaust exit. The size of the exhaust discharge opening is thus increased. As a result, the gas flow rate discharged from the exhaust passage 2-40 per unit time maybe increased, so that excessive pressure and excessive accumulation of heat from a large amount of exhaust gas in the exhaust passage 2-40 can be reduced.

In some example implementations, the extended exhaust structure 2-402 may be configured in the shape of a cone or frustum cone. The auxiliary exhaust structure 2-403 may be configured, for example, in a cylindrical structure. The auxiliary exhaust structure 2-403 and the extended exhaust structure 2-402 may be connected via flanges or bolts. For example, a structure such as a sealing ring may also be provided between the auxiliary exhaust structure 2-403 and the extended exhaust structure 2-402, so that the auxiliary exhaust structure 2-403 and the extended exhaust structure 2-402 are sealedly connected.

In some example implementations, the auxiliary exhaust structure 2-403 may be configured to guide the gas exhausted from the gas turbine 2-20 to a location away from the power generation system, so as to avoid affecting the operational environment around the first vehicle 2-10.

In some example implementations, various parts of the exhaust passage 2-40, such as the volute exhaust structure 2-401, the extended exhaust structure 2-402, and the auxiliary exhaust structure 2-403, may be fabricated from materials with high temperature resistance and thermal conductivity, such as metal materials including but not limited to copper, aluminum, or alloy materials thereof.

In some example implementations, as shown in FIGS. 4 and 5, the power generation equipment above may further include an intake passage 2-60. The intake passage 2-60 may be disposed at least on a side of the gas turbine 2-20 away from the portion of the first platform 2-101 where the gas turbine engine resides. One or more intake pipelines 2-601 may communicate with the first input end 2-201 of the gas turbine 2-20 to provide combustion air for the gas turbine 2-20.

In some example implementations, the intake passage 2-60 may extend from an end of the first housing 2-102 away from the generator 2-30, such as extending above the gas turbine 2-20, thereby forming a longer intake passage 2-60 for supplying combustion air to the gas turbine 2-20. The one or more intake pipelines 2-601 may respectively connected to the intake passage 2-60 and the first input end 2-201 of the gas turbine 2-20 in a sealed manner. For example, the intake pipelines 2-601 can be arc-shaped to guide the flow of combustion air and reduce pressure loss.

In some example implementations, the intake passage 2-60 may also be provided with an intake filter and muffler device and a ventilation filter and muffler device (not shown in the figure). When the combustion air gas is being provided, the noise at the position of the gas inlet of the gas turbine 2-20 may be reduced to avoid pollution to the environment. The ventilation filter muffler may be used for filtering ambient air, providing filtered air for ventilation and cooling for the gas turbine 2-20, and for performing noise reduction in the intake passage 2-60 to reduce environmental pollution.

In some example implementations, as shown in FIGS. 4 and 5, the power generating system above may further include a generator control device configured to communicate with the generator 2-30, by, for example, wired or wireless communications to monitor and control the operation of the generator 2-30. In some example implementations, the power generation equipment may further include a gas turbine control device 2-204 configured to communicate with the gas turbine 2-20 in a wired or wireless manner, for monitoring and controlling the operation of the gas turbine 2-20. As a result, automation can be achieved and the safety of the operation of the gas turbine and the electric generator can be improved.

In some example implementations, as shown in FIG. 4, the side of the first casing 2-102 may include a plurality of doors. One example door 2-102C is shown in FIG. 4 The plurality of doors may correspond to different parts of the system, e.g., the gas turbine 2-20, different parts of the passage 2-40 and the generator 2-30, thereby facilitating an inspection and maintenance of the gas turbine 2-20, the exhaust passage 2-40, and the different parts of the generator 2-30 through the multiple doors.

In some example implementations, as shown in FIGS. 4 and 5, the central axes of the gas turbine 2-20 and the generator 2-30 may be disposed along the length of the first vehicle. The second output end 2-302 of the electric generator 2-30 may be configured to face the rear of the first vehicle. The rear of the first casing or housing 2-102 may be provided with a connection opening or door 2-102B, so as to provide electrical connection to the second output end 2-302 of the generator 2-30 by other devices/circuits/system to provide electrical energy thereto.

Figure 7:
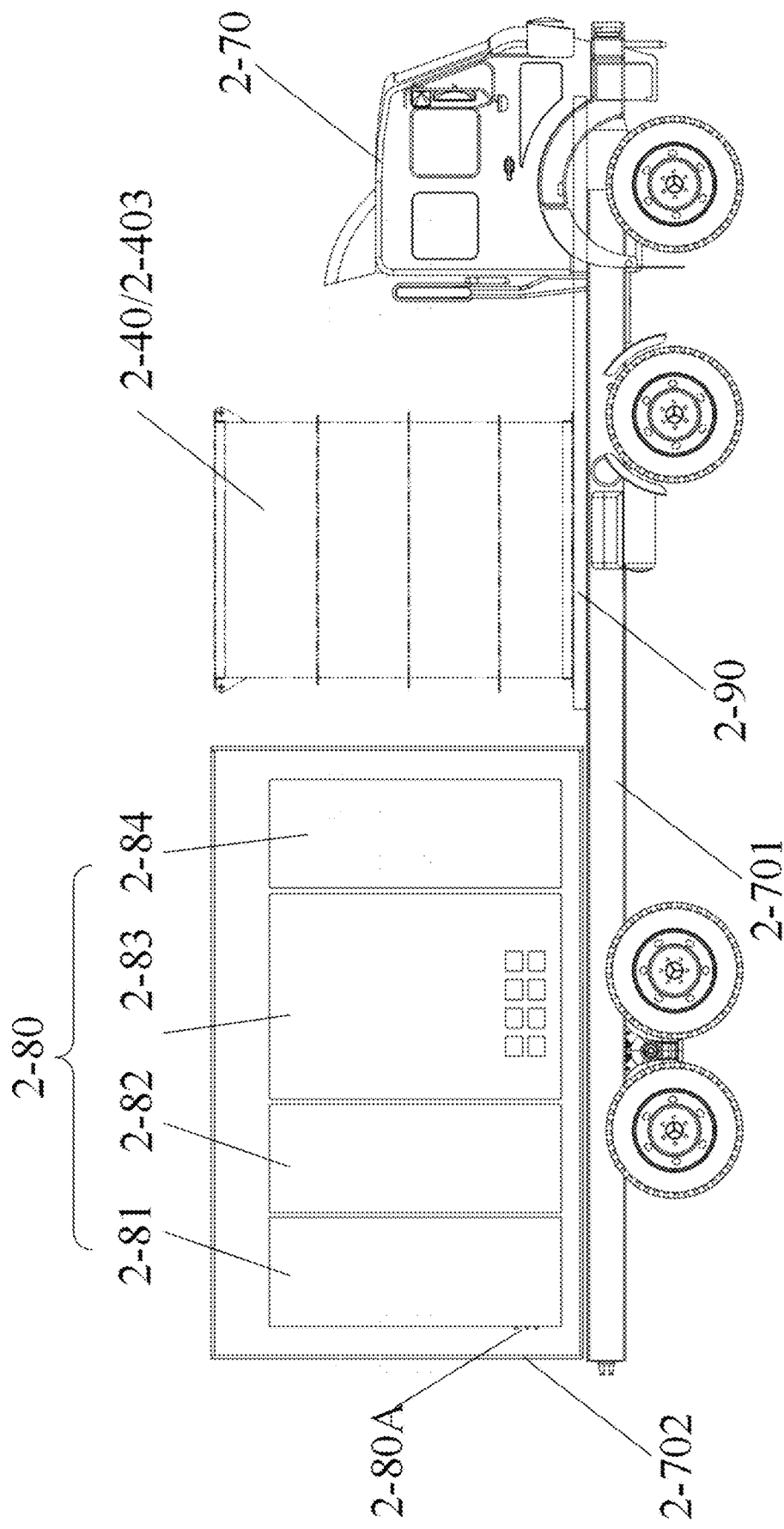
FIG. 7 shows a side view of an example power distribution system as provided according to an embodiment of the present disclosure.
Figure 8:
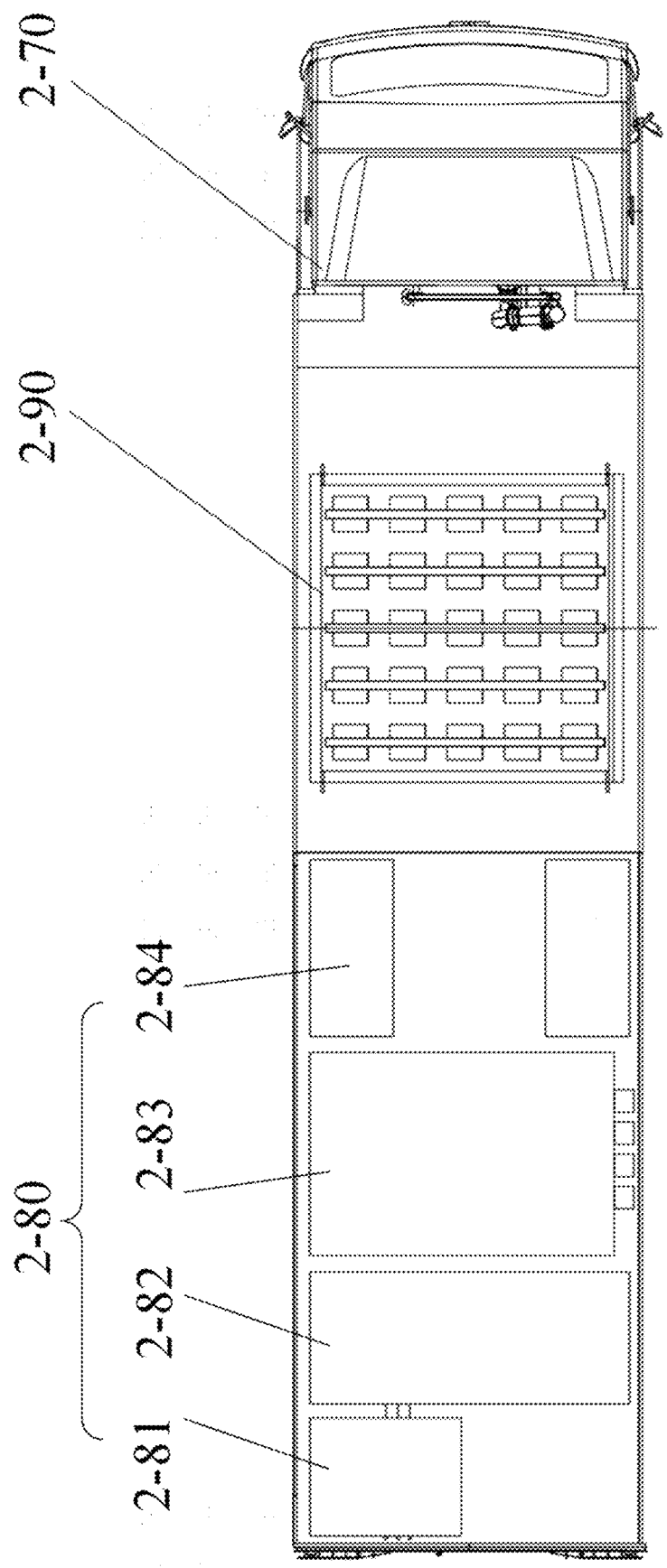
FIG. 8 shows a top view of the example power distribution system of FIG. 7 provided according to an embodiment of the present disclosure.
Figure 9:
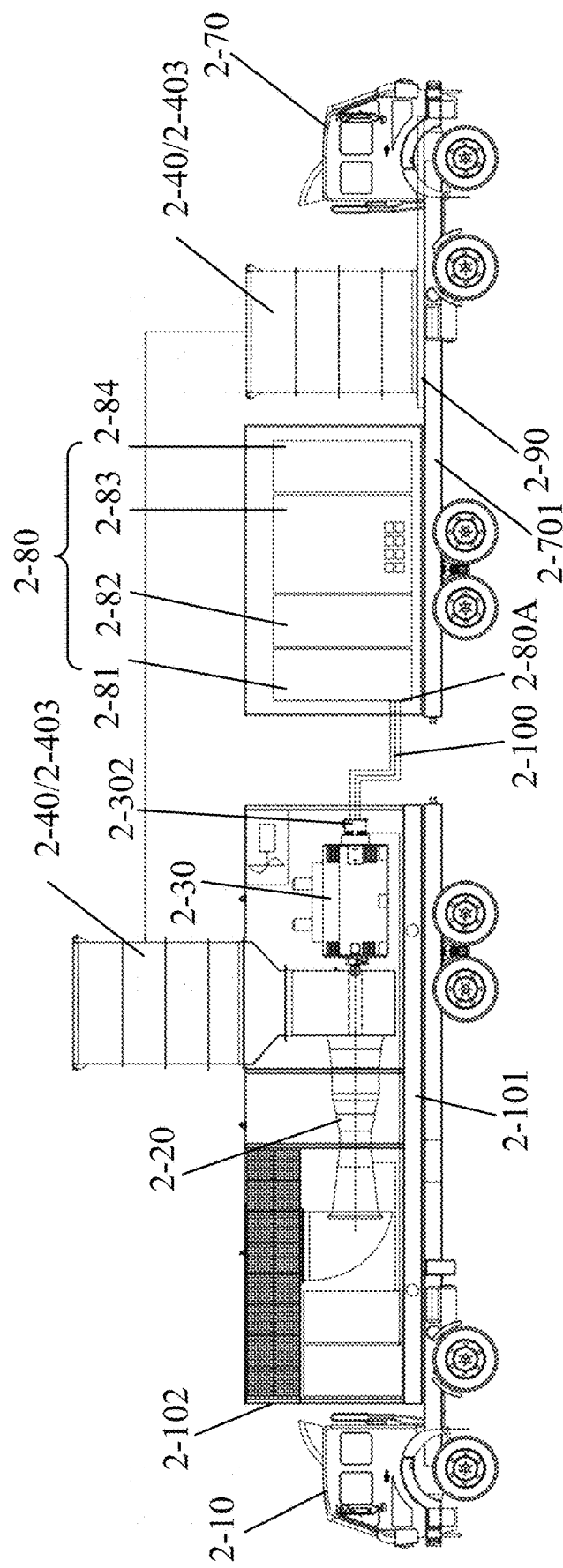
FIG. 9 shows a side view of an example power system as provided according to an embodiment of the present disclosure.
Figure 10:
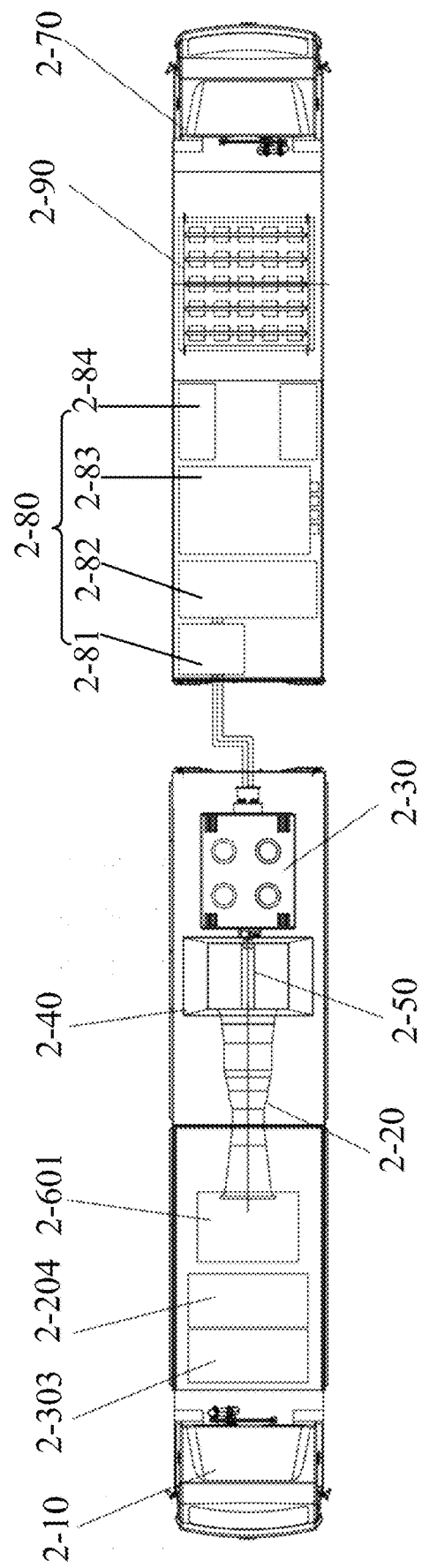
FIG. 10 shows a top view of the power system of FIG. 9 as provided according to an embodiment of the present disclosure.

The power generation systems above may be configured to couple to a power distribution system or equipment. For example, FIG. 7 shows a side view of an example power distribution equipment, whereas FIG. 8 shows a top view of the power distribution equipment. The power distribution equipment or system may be mobile, e.g., be disposed on a vehicle. FIGS. 9 and 10 show a side view a top view of an example power system including the power distribution equipment and the power generation system described above. As shown in FIG. 7 and FIG. 8, the example power distribution system may include a second vehicle 2-70 (alternatively referred to as a second means of transportation 2-70) and a power distribution device 2-80. The second vehicle 2-70 may include a second platform 2-701. A second casing or housing 2-702 may be provided on the second platform 2-701, As further shown in FIG. 9 and FIG. 10, the power distribution device 2-80 may be disposed in the second casing or housing 2-702, and may include a third input 2-80A configured to be electrically connected to the second output 2-302 of the electric generator 2-30 described above, via, for example, a conductive cable 2-100 to obtain electrical energy from the generator 2-30.

In some example implementations, as shown in FIGS. 7 and 8, the power distribution device 2-80 may include a frequency converter 2-81, a transformer 2-82, a power distribution cabinet 2-83, a monitoring and control device 2-84, and the like. As such, the power distribution device 2-80 may be configured to regulate the power generation, the frequency, the voltage, and the like of the output power from the generator 2-30. The power distribution device 2-80 thus may be used to convert any non-standard electrical output by the generator 2-30 into the standard electrical supply system required by the downstream load of the power system. For example, the monitoring and control device 2-84 may be configured to communicate with the frequency converter 2-81, the transformer 2-82, and the power distribution cabinet 2-83, for example, in a wired or wireless manner, so as to monitor and control the frequency converter 2-81, the transformer 2-82, and the power distribution cabinet individually or collectively. The operation of the output frequency inverter 81, the transformer 2-82, and the power distribution cabinet 2-83 may be monitored by the monitoring and control device 2-84. For example, the monitoring and control device 84 may be configured to adjust the output frequency of the inverter 2-81, the output voltage of the transformer 2-82, and the power distribution mode of the power distribution cabinet 2-83, and the like. In some example implementations, the second means of transport 2-70 (the second vehicle) may also be implemented as at least a vehicle including but not limited to one of a semi-trailer, a trailer, a truck, a skid, a barge, and the like.

In some example implementations, as shown in FIGS. 7 and 8, the second platform 2-701 may be further provided with an exhaust passage carrying area 2-90 configured to place or dispose at least part of the exhaust passage 2-40. The exhaust passage 2-40 may be implemented as or may include the example auxiliary exhaust structure 2-403 described above. For example, the exhaust passage carrying area 2-90 may include a groove matching a shape of the auxiliary exhaust structure 2-403, whereby the auxiliary exhaust structure 2-403 may be stably arranged on the exhaust passage carrying area 2-90 by being snapped-fit into the groove. As such, after the auxiliary exhaust structure 2-403 is disassembled from the extended exhaust structure 2-40 described above, it can be placed in the exhaust passage carrying area 2-90 of the second platform 2-701. The auxiliary exhaust structure 2-403 may thus be transported by the second transportation means 2-70.

In some example implementations, before using the above-described power system, the auxiliary exhaust structure 2-403 may be disposed in the exhaust passage carrying area 2-90 of the second transportation means 2-70 to be transported by the second transportation means 2-70. When using the above-mentioned power distribution system on the vehicle 2-70 of FIGS. 7-9 with the power generation system, firstly, the first vehicle 2-10 may be parked at a desired position with the rear of the vehicle facing the power distribution device 2-80 of the power distribution system, and at the same time, the second vehicle 2-70 may be parked at a suitable position with the rear of the vehicle facing the power generation system. Then, the rears of the first vehicle 2-10 and the second vehicle 2-70 may be connected by means of flange coupling, so as to maintain a table relative position and orientation of the first vehicle 2-10 and the second vehicle 2-70 stable.

Thereafter, the auxiliary exhaust structure 2-403 disposed in the exhaust passage carrying area 2-90 may be unloaded and installed on the extended exhaust structure 2-402 on the first transportation means 2-10 for integration with the exhaust passage of the gas turbine. For example, the auxiliary exhaust structure 2-403 may be moved to the roof of the first vehicle 2-10 for connection and installation with the extended exhaust structure 2-402. In some example implementations, a hoisting device may be integrated on the second transportation means 2-70 for moving the extended exhaust structure 2-402, so as to improve on-site deployment efficiency. Thereafter, cable 2-100 may be used to connect the third input end of the power distribution device 2-80 and the second output end 2-302 of the electric generator 2-30, so that the power output from the generator 2-30 can be distributed by the power distribution device 2-80.

In some example implementations, the power generation system and the power distribution system may also be connected and used in other ways than the above-mentioned example embodiments which are not specifically limited in the embodiments of the present disclosure.

In the example implementations depicted in FIGS. 1-8 above, rotational power is generated by the gas turbine system. The output of the gas turbine may be use to drive the electric generator directly. The electric generator may be integrally installed and connected with the output of the gas turbine, as shown by FIGS. 7-8. Alternatively, the electric generator may be carried by a separately vehicle and may then be assembled and coupled to the gas turbine for electric power generation, as shown in the implementations depicted in FIGS. 1-3.

In some other implementations, the turbine may be used to drive some other types of loads. The gas turbine, and other loads may be configured to be switchable. As such, the gas turbine may be conveniently configured for multiple purposes and conveniently switch between different types of loads as needed. For example, such a switchable configuration may be used in an oil field or well site and the gas turbine system may be used to drive one or more hydraulic pumping systems (e.g., one or more plunger pumps) for hydraulic fracturing operation or may be used to drive one or more electric generator for electric power generation for various used at the oil field or well site. These loads for the gas turbine may be conveniently switchable, thereby providing a highly reconfiguration power generation and delivery platform in an oil field or well site.

For example, switching may be made between fracturing operation and electric power generation to balance the fracturing and electric demand of the well site and the fracturing operation. Such a load switchable systems or platforms, for example, may include a power generation system (e.g., a gas turbine), a power transmission device and a bearing base. The power transmission device may be connected with the power device. The bearing base may be configured for carrying and fixing a load, e.g., a plunger pump or an electric generator, where the plunger pump and electric generator may be switchable. Such a switchable system may be configured to switch between a first operational state and a second operational state. Under the first operational state, the plunger pump may be installed and fixed on the bearing base and connected with or coupled to the power transmission device. In the first operational state, the switchable platform may function as a fracturing system. Under the second operational state, the electric generator rather than the plunger pump may be fixed and installed on the bearing base and connected with or coupled to the power transmission device. In the second operational state, the switchable platform may function as an electric power generation system for supply electricity of various type of uses at the oil filed or well site.

Thus, in the switchable power platform above, the power transmission device may be configured to be connectable with either the power input end of the plunger pump or the rotational power input of the electric generator. Such dual use platform may help reduce operational footprint in oil fields or well sites.

An example well site may include a manifold and a plurality of fracturing and electric power generation switchable systems describe above. The manifold may be configured to transport fracturing fluid to a wellhead of the well site. The plurality of switchable systems may be arranged at two sides of the manifold and may be connected with or coupled to the manifold. The at least one of the plurality of switchable systems may operate in the first state when connected to the manifold. In other words, each gas turbine in the plurality of switchable system may be configured to drive the one or more plunger pump for pumping fracturing fluid into the wellhead via the manifold.

In some example implementations of this present disclosure, a control method of the well site as described above may be provided. Such a control method may include: according to fracturing fluid displacement data output by each of the plurality of switchable systems in the first state, generating a fracturing fluid displacement information, wherein the fracturing fluid displacement information includes the fracturing fluid displacement data of each of the plurality of switchable system in the first state and a total fracturing fluid displacement value obtained by summing all of the displacement data at each of the switchable systems. The control method may further include obtaining a fracturing fluid displacement demand input, and, when the total fracturing fluid displacement value is greater than or equal to the fracturing fluid displacement demand, outputting or generating a standard-compliant information. Otherwise, the method may output a standard-non-compliant information. In response to the standard-compliant information, based on the fracturing fluid displacement information and the fracturing fluid displacement demand, selecting at least one switchable system from the plurality of switchable systems operating in the first state to generate a switching information, wherein the switching information includes the number of switchable systems selected to be switched from the first state to the second state; and when the number of the switchable apparatuses in the switching information is greater than a number of electric generators in demand, further selecting switchable apparatuses with a same number of the electric generators in demand in within the switchable systems within the switching information and generating a replacement information for specifying switchable systems to be actually switched from the first state to the second state.

The example implementations above of the switchable systems are described in further detail below with reference to the accompanying drawings in FIGS. 11-19.

Figure 13:
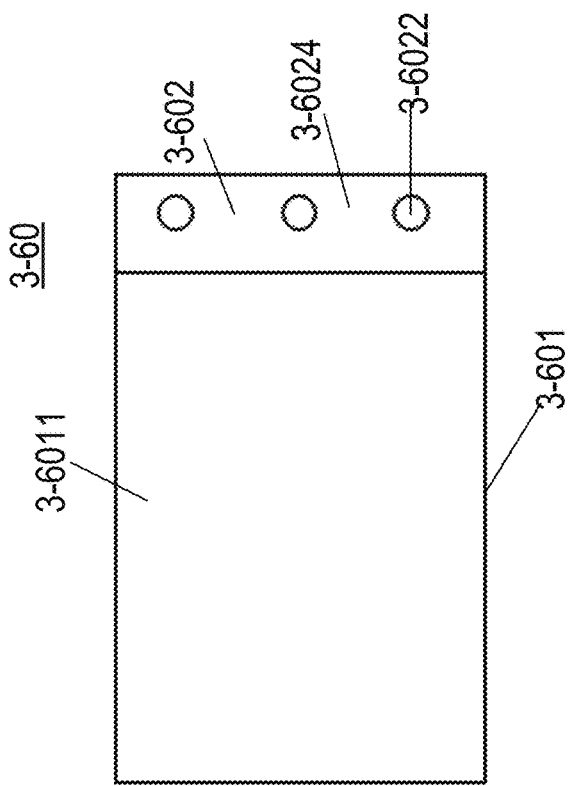
FIG. 13 shows a schematic block diagram of an example bearing base as provided according to an embodiment of the present disclosure.

FIG. 11 shows a structural schematic diagram of an example fracturing and power generation switchable system provided by at least one embodiment of the present disclosure. FIG. 12A illustrates a schematic block diagram of an example fracturing and power generation switchable system provided by at least one embodiment of the present disclosure. FIG. 12B shows a schematic block diagram of another example fracturing and power generation switchable system provided by at least still one embodiment of the present disclosure. FIG. 13 shows a schematic block diagram of a bearing base in accordance with at least one embodiment of the present disclosure.

In some example implementations, as shown in FIG. 11, FIG. 12A, and FIG. 12B, the fracturing and power generation switchable system 3-1 may include a power device 3-10 and a power transmission device 3-20. The power device 3-10 may be connected with or coupled to the power transmission device 3-20. The power device 3-10 transmits a driving power (e.g., rotational power) or driving force/torque produced by the power device 3-10 to the power transmission device 3-20. The power transmission device 3-20 may convert the driving power or force into an appropriate rotational speed range and transmit the driving power or force to a next-stage. For example, an output end of the power transmission device 3-20 may be connected with a plunger pump 3-40 or an electric generator 3-50, where the plunger pump 3-40 and the electric generator 3-50 are switchable.

In some example implementations, as shown in FIG. 13, the fracturing and power generation switchable systems 3-1 further may include a bearing base 3-30. The bearing base 3-30 may be configured for carrying and fixing the plunger pump 3-40 or the electric generator 3-50. For example, the bearing base 3-30 may be adapted to carry and fix the plunger pump 3-40 connected with the power transmission device 3-20 when the plunger pump 3-40 is in operation, and is also adapted to carry and fix the electric generator 3-50 connected with the power transmission device 20 when the electric generator 3-40 needs to be in operation.

For example, the fracturing and power generation switchable system 3-1 may be configured to switch between the first state and the second state. Under the first state, the plunger pump 3-40 may be fixed on the bearing base 3-30 and connected with the power transmission device 3-20, under this case, the switchable apparatus may be deployed as a fracturing apparatus. The fracturing apparatus may be configured to pressurize the fracturing fluid transported in the well site and push the fracturing fluid into the wellhead. In the second state, the electric generator 3-50 rather than the plunger pump may be fixed on the bearing base 3-30 and connected with or coupled to the power transmission device 3-20. In the second state, the switchable system is configured as an electric power generation system. The power generation system may provide electric power generation by the power generation apparatus and supply the generated electricity to devices or locations that are in need of electricity. For example, when the fracturing and power generation switchable system 3-1 is provided in the well site, and electrical power sources in the well site are not enough, switchable systems 1 other than those switchable apparatus deployed as the fracturing apparatus can be designated as power generation apparatuses. As such, adaptive sufficient electric power supply capacity at the well site may be provided. The fracturing and power generation switchable system 3-1 provided by the above implementations of the present disclosure may help reduce a number of the electric generators in the well site, so that the space occupied by the various well site devices and equipment may be reduced.

In some example implementations, as shown in FIG. 13, the bearing base 3-30 may include a bearing component 3-301, first fixing plates 3-302, and second fixing plates 3-303. For example, the first fixing plates 3-302 and the second fixing plates 3-303 are arranged on a bearing surface 3-308 of the bearing component 3-301. For example, the bearing surface 3-308 may include four rectangular surfaces. The first fixing plates 3-302 and the second fixing plates 3-303 may be arranged at two opposite sides of the bearing surface 3-308. The number of the first fixing plates 3-302 and the number of the second fixing plates 303 may be arranged at intervals. For example, the first fixing plates 3-302 and the second fixing plates 3-303 are fixing blocks with threaded holes or fixing holes, respectively. In some example implementations, the bearing component 3-301 may be configured to carry the plunger pump 3-40 or the electric generator 3-50, the first fixing plates 3-302 may be adapted to fix the plunger pump 3-40, and the second fixing plates 3-303 may be adapted to fix the electric generator 3-50.

Positions of the first fixing plates 3-302 (for example, the threaded holes or the fixing holes in the first fixing plates 3-302) may be configured with a fixing structure (for example, is located at the bottom surface of the plunger pump 3-40) corresponding to the plunger pump 3-40, to fix the plunger pump 3-40, so that when the switchable system is operating in the first state, the plunger pump 3-40 may be firmly connected with the power transmission device 3-30. Positions of the second fixing plates 3-303 (for example, the threaded holes or fixing holes in the second fixing plate 3-303) is configured with a fixing structure (for example, is located at the bottom surface of the electric generator 3-50) corresponding to the electric generator 3-50, to fix the electric generator 3-50, so that when the switchable system operates in the second state, the electric generator 3-50 may be firmly connected with the power transmission device 3-30. The implementations of the various parts of the bearing base 3-30 above, including the bearing component 3-301, the first fixing plates 3-302 and the second fixing plates 3-303 are merely examples. The number of these components are not limited as shown in FIG. 13. Other alternative structures can be implemented and adapted to fix/install the plunger pump 3-40 or the electric generator 3-50 on the bearing base 3-30.

In some example implementations, as shown in FIG. 13, the bearing base 3-30 may further include a supporting frame 3-304, a top plate 3-305, a bottom plate 3-306, and a relief groove 3-307. The support frame 3-304 may be located between the top plate 3-305 and the bottom plate 3-306 to support the top plate 3-305 and the bottom plate 3-306. For example, the upper surface of the top plate 3-305 may include the bearing surface 3-308. The relief groove 3-307 may be located between the top plate 3-305 and the bottom plate 3-306. During a transportation process, one or more forklift arms of a forklift truck may be inserted into the relief groove 3-307 to unload or carry the bearing base 3-30 by the forklift truck.

In some example implementations, as shown in FIG. 11, FIG. 12A, and FIG. 12B, the power device 3-10 may include a turbine engine 3-101. For example, the power transmission device 3-20 may include a speed reducer 3-201. In some example implementations, the electric generator 3-50 may include an electric power generation unit. After being slowed down by the speed reducer 3-201, the rotational driving force output by the turbine engine 3-101 can provide power input for either the plunger pump and the electric generator 3-50 in a switchable manner. An output shaft of the turbine engine 3-101 and an input shaft 3-2012 of the speed reducer 3-201 may be connected with each other by a flange 3-202 (shown in FIG. 11). When the switchable system 3-1 is in the first state (e.g., the switchable system 3-1 is deployed as a fracturing system to power one or more plunger pumps), the output shaft 3-2012 of the speed reducer 3-201 may be directly connected with the input shaft of the plunger pump 3-40. Alternatively, the output shaft 3-2012 of the speed reducer 3-201 and the input shaft of the plunger pump 3-40 may be coupled/connected with each other via a coupling 3-203 to for rotational power transmission. When the switchable system 3-1 is in the second state (e.g., the switchable system 3-1 is deployed as the power generation system to drive one or more electric generators), the output shaft 3-2012 of the speed reducer 3-201 may be directly connected with the input port of the electric generator 3-50. Alternatively, the output shaft 3-2012 of the speed reducer 3-201 and the input port of the electric generator 3-50 may be coupled/connected with each other by a coupling 3-203 to transmit the rotational power to the electric generator. In the examples described above, the structure of the switchable system 3-1 may be implemented in a compact manner.

In some example implementations, as shown in FIG. 12B, the power transmission device 3-20 may further include a torque limiter 3-2013, and the speed reducer 3-201 and the torque limiter 3-2013 may be connected with each other. The output end of the torque limiter 3-2013 may be connected with the coupling 3-203, so as to better control the rotational power output by the power transmission device 3-20.

In some example implementations, the coupling 3-203 may be implemented as one of structures including but not limited to a flexible coupling, a transmission shaft, and a clutch. The embodiments of the present disclosure are not limited to these.

In some example implementations, the plunger pump 3-40 and the electric generator 3-50 may not connected with the speed reducer 3-201 at the same time but may be configured to as switchable loads to the gas turbine engine.

Figure 14B:
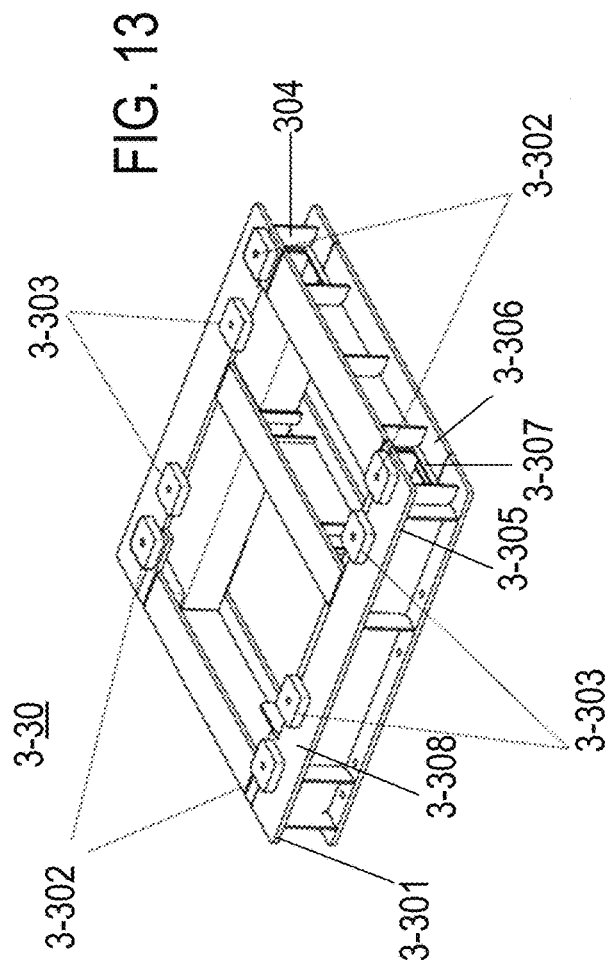
FIG. 14B shows a schematic top view of the example connection unit as shown in FIG. 14A.
Figure 14A:
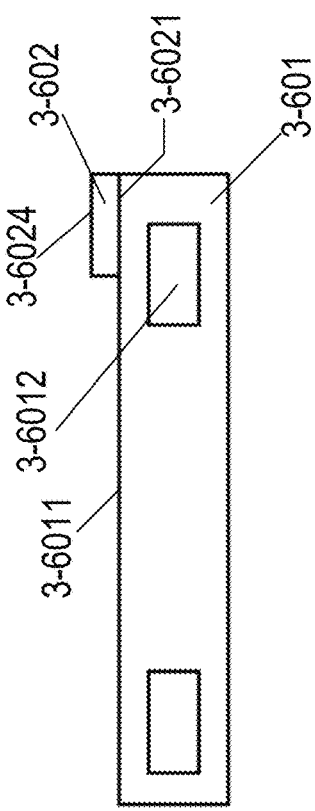
FIG. 14A shows a schematic front view of an example first connection unit in an unfolded state as provided according to an embodiment of the present disclosure.

FIG. 14A further shows a schematic front view of a first connection unit provided by at least one embodiment of the present disclosure. FIG. 14B shows a schematic top view of the first connection unit as shown in FIG. 14A.

In some example implementations, as shown in FIG. 14A, separate instances of a first connection unit 3-60 may be detachably arranged on the electric generator 3-50 and the plunger pump 3-40, respectively. The electric generator 3-50 may be connected with pipelines/cables/wires required for the operation of the electric generator 3-50 by the first connection unit 3-60. The plunger pump 3-40 may be connected with pipelines/cables/wires required for the operation of the plunger pump 3-40 by the first connection unit 3-60. For example, the separate instances of the first connection unit may be installed to the electric generator 3-50 and the plunger pump 3-40 through respective connection port 3-6012. Through the first connection unit 3-60, the plunger pump 3-40 or the electric generator 3-50 can be quickly connected with pipelines/cables/wires required for their operation, thereby enabling the switchable system 1 to quickly switch between the first state and the second state.

In some example implementations, as shown in FIG. 14A and FIG. 14B, the first connection unit 3-60 may further include a base 3-601 and a connection structure 3-602. The connection structure 3-602 may be movably connected with the base 3-601. For example, the connection structure 3-602 and the base 3-601 may be connected by structures including but not limited to bolts or pins, so that the connection structure 3-602 can turn or move relative to the base 3-601, as described in further detail below.

In some example implementations, as shown in FIG. 14B, the connection structure 3-602 may include a plurality of interfaces 3-6022, and the plurality of interfaces 3-6022 may be configured to connect the pipelines/cables/wires required for the operation of the plunger pump 3-40 or the electric generator 3-50. For example, the connection structure 3-602 may be arranged with interfaces 3-6022 (for example, quick connectors, sockets, pass throughs, and the like) for connecting lubricating pipelines, control cables, or hydraulic pipelines, electric cables, sensor wires/cables. The plurality of interfaces 3-6022 may each be configured to connect with at least one of the lubrication pipelines, the control cables, electric cables, sensor wires/cables, and the hydraulic pipelines. That is, the various pipelines/cables/wires required for the operation of the electric generator 3-50 or the plunger pump 3-40 may be guided to the several interfaces for direct connection, which can speed up the connection and installation process and the switching process.

In some example implementations, as shown in FIG. 14A and FIG. 14B, a plurality of interfaces 3-6022 may pass through or be inserted into a plug-in surface 3-6024 of the connection structure 3-602. When the connection structure 3-602 is not connected with the pipelines/cables/wires required for the operation of the power generating device 3-50 or the plunger pump 3-40 (for example, when the switchable system 3-1 is in a non-operating state or a configuration state), the plug-in surface 3-6024 of the connection structure 3-602 aligns parallel with the surface 3-6011 of the base 3-601. For example, the plug-in surface 3-6024 may be located at a main surface of the connection structure 3-602. The main surface of the connection structure 3-602 may be a surface with a largest area of the connection structure 3-602 facing upward in the state of the connection structure 3-602 as shown in FIG. 14A and FIG. 14B (a state in which the pipelines/cables/wires are not connected). In the case where the main surface of the connection structure 3-602 is a plane, the plug-in surface 3-6024 and the main surface are arranged in a same plane. The surface of the connection structure 3-602 opposite to the plug-in surface 3-6024 may be referred to as a bottom surface 3-6021 of the connection structure 3-602. The bottom surface 3-6021 may be attached to or coincide with the surface 3-6011 of the base 3-601. Under this case, the pipelines/cables/wires to the electric generator or plunger pump may not be connected and the first connection unit 3-60 may be referred to as being in a folded state. The size of the first connection unit 3-60 in such folded state is therefore reduced, facilitating transportation and storage of the first connection unit 3-60.

Figure 15B:
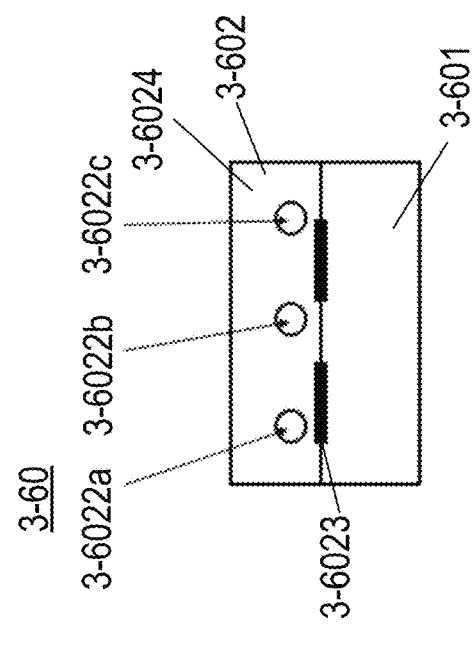
FIG. 15B is a schematic side view of the example connection unit as shown in FIG. 15A.
Figure 16B:
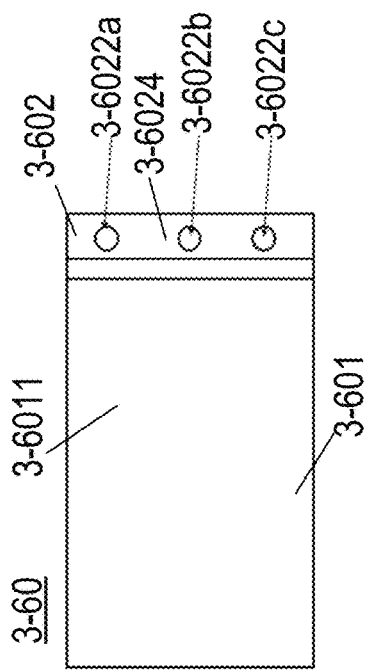
FIG. 16B shows a schematic top view of the example connection unit as shown in FIG. 16A.
Figure 15A:
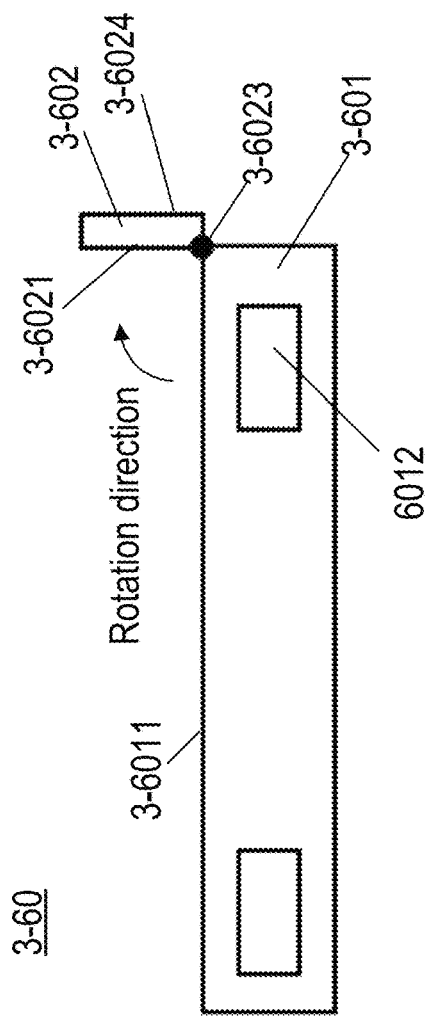
FIG. 15A shows a schematic front view of the example connection unit as shown in FIG. 14A in an unfolded state.
Figure 16A:
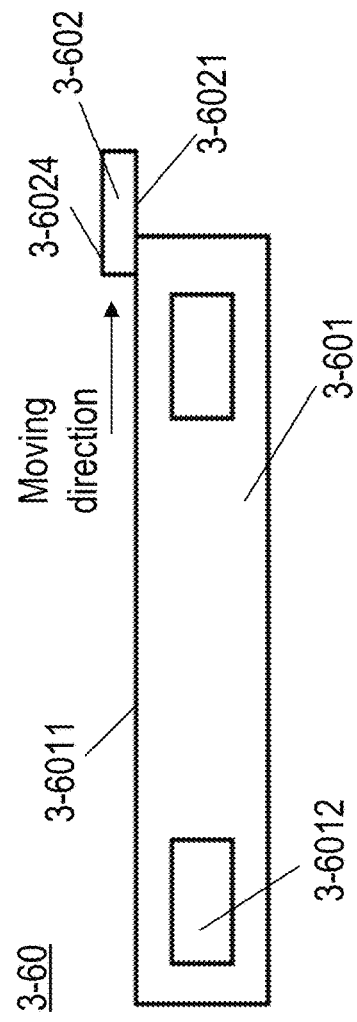
FIG. 16A shows another schematic front view of the example connection unit as shown in FIG. 14A in an extended state.

FIG. 15A further shows a schematic front view of the first connection unit 3-60 shown in FIG. 14A in an unfolded state. FIG. 15B is a schematic side view of the first connection unit as shown in FIG. 15A in the unfolded state. FIG. 16A shows another schematic front view of the first connection unit as shown in FIG. 14A in an unfolded state. FIG. 16B shows a schematic top view of the first connection unit as shown in FIG. 6A in the unfolded state.

In some example implementations, as shown in FIG. 15B and FIG. 16A, the plurality of interfaces 3-6022 may include a first interface 3-6022a, a second interface 3-6022b, and a third interface 3-6022c. For example, when the plurality of interfaces 3-6022 are connected with the pipelines/cables/wires required for the operation of the electric generator 3-50, the first interface 3-6022a may be configured for quickly plugging with lubrication pipelines; the second interface 3-6022b may be configured for quickly plugging with control cables; and the third interface 3-6022c may be configured for quickly plugging with sensor wires. In some example implementations, when the plurality of interfaces 3-6022 are connected with the pipelines/cables/wires required for the operation of the plunger pump 3-40, the first interface 3-6022a may be configured for quickly plugging with the lubrication pipelines; the second interface 3-6022b may be configured for quickly plugging with the control cables; and the third interface 3-6022c may be configured for quickly plugging with the hydraulic pipelines. It should be noted that a number of the plurality of interfaces 3-6022 is not limited to three, and can be determined according to the number of interfaces required by the pipelines/cables/wires needed for the operation of the power generating device 3-50 or the plunger pump 3-40.

In some example implementations, as shown in FIG. 15A and FIG. 15B, the connection structure 3-602 and the base 3-601 may be rotatably (or hingedly) connected. For example, the connection structure 3-602 may be hinged with the base 3-601. The connection structure 3-602 and the base 3-601 may be connected by a connection component 3-6023 (e.g., a hinge). The connection component 3-6023 may allow the connection structure 3-602 to rotate relative to the base 3-601 in a direction labeled as "rotation direction" and indicated by the corresponding arrow in FIG. 15A. When the connection structure 3-602 is connected with the pipelines/cables/wires required for the operation of the electric generator 3-50 or the plunger pump 3-40 (for example, in the operating state of the switchable system 3-1 (deployed as the fracturing system or the power generation system)), the plug-in surface 3-6024 (and the bottom surface 3-6021) of the connection structure 3-602 rotates toward a side away from the surface 3-6011 of the base 3-601, so that the bottom surface 3-6021 of the connection structure 3-602 is perpendicular to the surface 3-6011 of the base 3-601, and the connection structure 3-602 may be connected with the pipelines/cables/wires required for the operation of the power generating device 3-50 or the plunger pump 3-40 from sideways. Accordingly, after the first connection unit 3-60 is installed on the turbine engine 3-101, the first connection unit 3-60 is unfolded (for example, by a 90° rotation), the lubrication pipelines, the control cables, the sensor wires, and the electric cables required when the generator is in operation may be quickly connected by the interfaces 3-6022.

In some example implementations, as shown in FIG. 16A and FIG. 16B, the connection structure 3-602 may be movably connected with the base 3-601. For example, the connection structure 3-602 may be integrated with the plug-in surface 3-6024 (and the bottom surface 3-6021). A sliding rail may be arranged at the bottom surface 3-6021 of the connection structure 3-602, so that the connection structure 3-602 can move or slide on the base 3-601. When the connection structure 3-602 is connected with the pipelines/cables/wires required for the operation of the electric generator 3-50 or the plunger pump 3-40 (for example, in an operational state of the switchable system 3-1 (deployed as the fracturing system or the power generation system)), the plug-in surface 3-6024 (and the bottom surface 3-6021) of the connection structure 3-602 may move to a side away from the base 3-602. In other words, the bottom surface 3-6021 of the connection structure 3-602 may move along a direction labeled as "moving direction" and indicated by the corresponding arrow in FIG. 16A. As a result of such sliding, an orthographic projection of the plug-in surface 3-6024 of the connection structure 3-602 on the plane parallel to the surface 3-6011 of the base 3-601 at least partially extend outside the surface 3-6011 of the base 3-601, and the bottom surface 3-6021 of the connection structure 3-602 correspondingly extends beyond the surface 3-6011 of the base 3-601. As such, the bottom surface 3-6021 of the connection structure 3-602 is exposed to allow the connection structure 3-602 to connect with the pipelines/cables/wires required for the operation of the electric generator 3-50 or the plunger pump 3-40. When the electric generator 3-50 or the plunger pump 3-40 is connected with the first connection unit 3-60 in the operational state, the connection structure 3-602 moves at least partially to the outside of the base 3-602, so that the bottom surface 3-6021 extends beyond the surface 3-6011 of the base 3-601 to allow the connection structure 3-602 to connect with other pipelines/cables/wires. The difference in the example implementations of FIG. 16A and FIG. 16B as compared with FIG. 15A and FIG. 15B is the linear versus rational movement of the connection structure 3-602 to change between the non-operational sate (folded state, transportation state, storage state) and operational state. Other configuration for the motion of the connection structure 3-602 are also contemplated. For example, the linear movement of the connection structure 3-602 need not be parallel to the surface 3-6011 of the first connection unit 3-60.

In some example implementations, as shown in FIG. 12B, the switchable system 3-1 may be detachably arranged with a second connection unit, the second connection unit may be configured to connect (e.g., electrically) with an electric generator that supplies electrical power to the switchable system 3-1. For example, the electric generator can also transmit electric energy to a power supply system in the well site where the switchable system 3-1 is located, then the electric energy is transmitted to the switchable system 3-1 from the power supply system. For example, the electric generator may be electrically connected with the switchable system 3-1 to supply power to devices that need to be electrically powered (such as a meter, a controller, a display, etc.) in the switchable system 3-1. For example, the electrical energy output by the electric generator can also be indirectly transmitted to the switchable system 3-1 via, for example, intermediate voltage transformation, which are not limited in the embodiments of the present disclosure. For example, the second connection unit may include a structure similar to that of the first connection unit (as shown in FIG. 14A, FIG. 14B, FIG. 15A, FIG. 15B, FIG. 16A, and FIG. 16B), or a modified version thereof. For example, the second connection unit may be provided with interfaces such as control cables, lubrication pipes, and hydraulic pipes. For example, the pipelines/cables/wires required for the switchable system to be powered may be arranged into several interfaces and for direct connection, so that the connection and installation can be sped up. In the case where the switchable system 3-1 in the well site needs to be powered, other switchable systems can be switched to the second state and deployed as a power generation system for the switchable system 3-1. In particular, the electric generator from the other switchable system may be connected with the switchable system 3-1 needing electric power supply, so that the electric power supplying capability of the well site is improved, and the space occupied by the various devices at the well site may be reduced.

Figure 17:
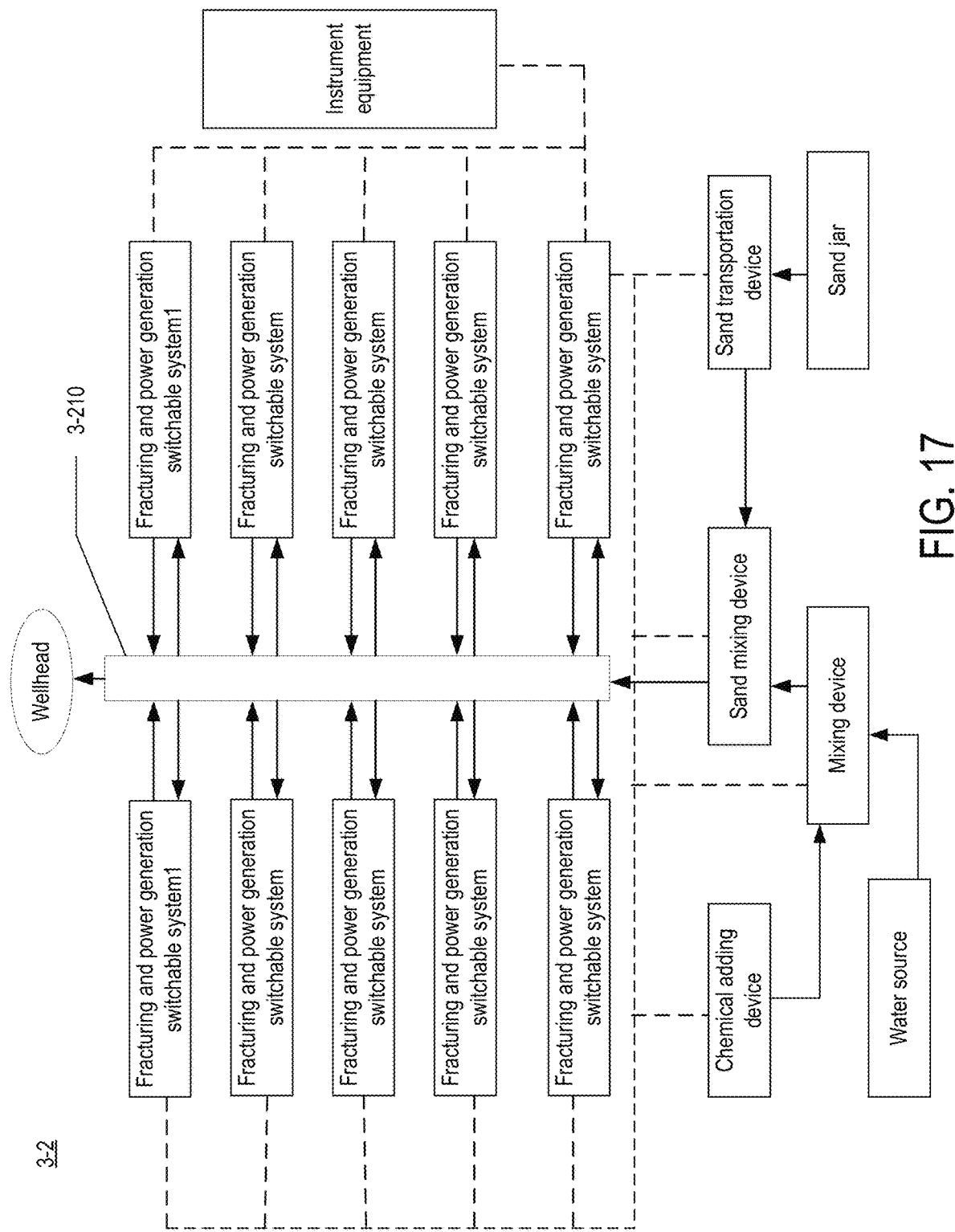
FIG. 17 shows a schematic diagram of an example layout of a well site as provided according to an embodiment of the present disclosure.

FIG. 17 shows a schematic diagram of a layout of a well site according to at least one embodiment of the present disclosure.

In some example implementations, as shown in FIG. 17, the well site 3-2 may include a manifold 3-210 and a plurality of fracturing and electric power generation switchable systems each of which may be implemented as the example fracturing and electric power generation switchable system described above in relation to FIGS. 11-16. The manifold 3-210 may be configured to transport or deliver fracturing fluid to the wellhead. The plurality of fracturing and electric power generation switchable system may be arranged at two sides of the manifold 3-210 and may be connected with the manifold 3-210 to collectively pressurize the fracturing fluid in the manifold 3-210 towards the wellhead. At least one of the plurality of fracturing and power generation switchable systems is configured to operate in the first state and is deployed as a fracturing system. Each of the plurality of fracturing and power generation switchable systems at the well site may quickly switch between the first state and the second state for deployment as an electric power generation system. For example, when the power transmission devices 3-20 of the plurality of fracturing and power generation switchable systems are connected with plurality of plunger pumps 3-40, the switchable systems are deployed as fracturing systems. When the power transmission devices 3-20 of the switchable systems are connected with the electric generators 3-50, the switchable systems are deployed as power generation systems. In FIG. 17, solid lines with arrows indicate manifold connections; solid lines indicate hydraulic fluid transporting lines; various arrows point to directions of flow (such as flow of the fracturing fluid); and the dashed lines indicate control cabling and also indicate mechanical connections between the various components. The hydraulic pressure of the fracturing fluid can be detected by a pressure gauge. The fracturing fluid may be input into the manifold 3-210 from a sand mixing device through a sand transportation device. Sand material of the fracturing fluid may be produced by a mixing device.

Figure 18:
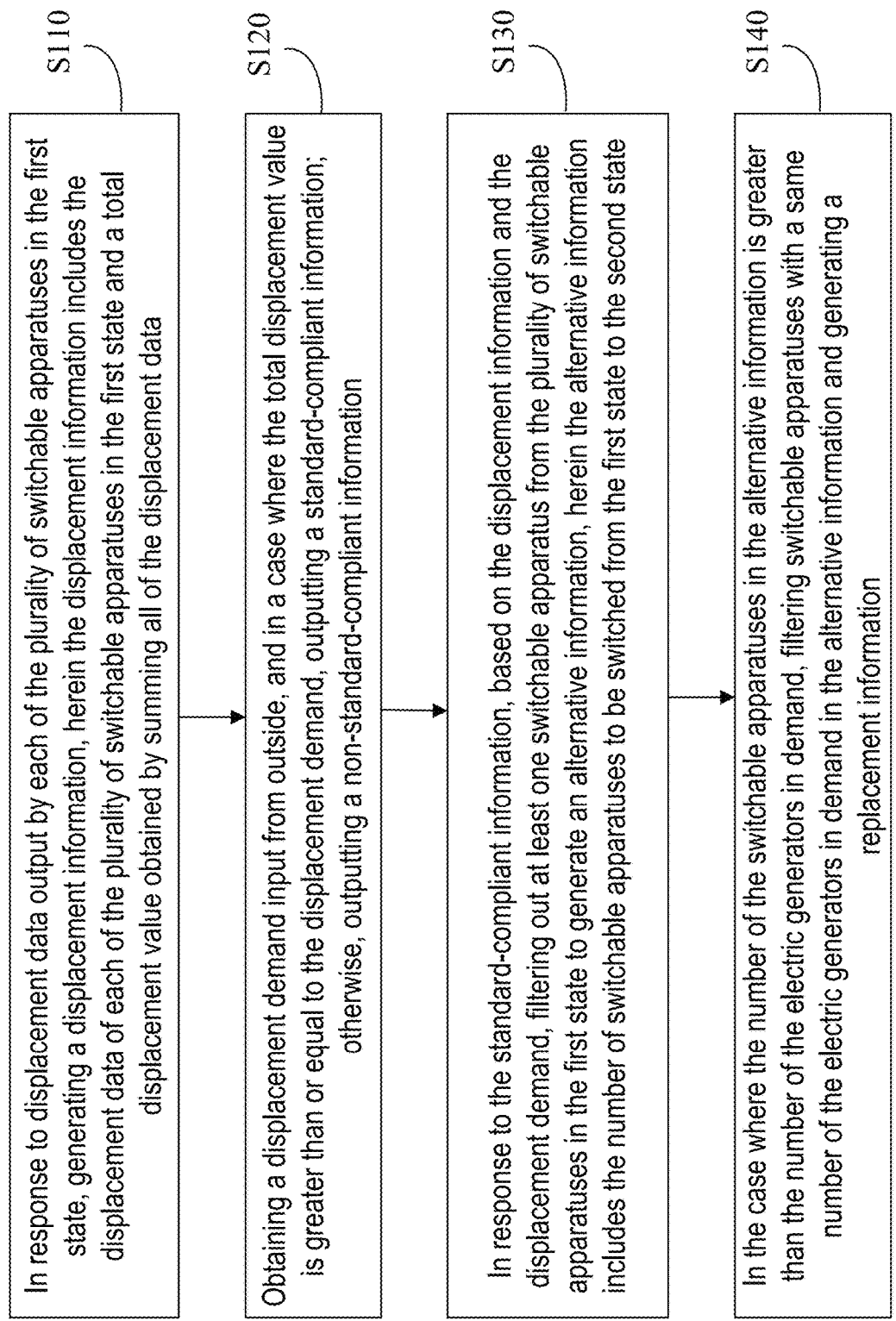
FIG. 18 shows a schematic flow chart of a control method of the well site shown in FIG. 17 as provided according to an embodiment of the present disclosure.

FIG. 18 shows a schematic flow chart of a control method of the well site as shown in FIG. 17 in accordance with at least one embodiment of the present disclosure. The example control method of the well site shown in FIG. 18 includes step S110 through step S140.

Step S110: in response to fracturing fluid displacement data output by each of the plurality of switchable systems in the first state, generating a fracturing fluid displacement information. The fracturing fluid displacement information may include but is not limited to the fracturing fluid displacement data of each of the plurality of switchable systems in the first state and a total fracturing fluid displacement value obtained by summing all of the fracturing fluid displacement data.

In some example implementations, the fracturing fluid displacement data of the switchable systems deployed as fracturing systems in the well site may be calculated, and the total fracturing fluid displacement of the switchable systems deployed as fracturing systems may be calculated.

Step S120: obtaining a fracturing fluid displacement demand, and when the total fracturing fluid displacement value is greater than or equal to the fracturing fluid displacement demand, generating/outputting a standard-compliant information/indication; otherwise, generating/outputting a standard-non-compliant information/indication. The fracturing fluid displacement demand is determined by the need at the wellhead for fracture formation and may be provided as an input parameter to the control system or may be a predefined value.

In some example implementations, the fracturing fluid displacement demand of the fracturing fluid required by the wellhead of the well site may be compared with the total monitored fracturing fluid displacement of the switchable systems deployed as fracturing systems as extracted from the fracturing fluid displacement information. When the total fracturing fluid displacement value is greater than or equal to the fracturing fluid displacement demand, it indicates that the fracturing fluid displacement of the switchable systems deployed as fracturing systems produce sufficient fracturing fluid to achieve a desired fracturing operation, or that the fracturing fluid displacement has a surplus over the desired amount. As such, when the total fracturing fluid displacement value is greater than the fracturing fluid displacement demand, and the switchable systems deployed as fracturing systems meets the fracturing fluid displacement demand, the surplus switchable systems deployed as fracturing systems may be switched to the second state and deployed as electric power generation systems instead. When the total fracturing fluid displacement value is less than a standard-non-compliant information, it indicates that the fracturing fluid displacement produced by the switchable systems deployed as fracturing systems is not enough to meet the requirement of the well site. Under this circumstance, no switchable systems deployed as fracturing systems are to be switched and deployed as electric power generation systems.

For example, both the standard-compliant information and the standard-non-compliant information may be generated in a form of an indication, an instructional, or the like.

In some example implementations, when the switchable systems in the first state in the well site is powered off, if no standard-compliant information or standard-non-compliant information is generated, an abnormal information/indication may be generated. For example, the abnormal information may indicate that communication failure may have occurred at the well site, such that the operational status of the switchable systems cannot be monitored normally. Under this circumstance, it may be necessary to invoke troubleshooting procedures. For example, the operation may be suspended to allow the staff or operators to perform maintenance and system check.

In some example implementations, power failure situations of the switchable systems in the well site can be detected by detecting voltages and/or currents in various circuit of the well site.

For example, when the switchable systems in the first state in the well site is not powered off, saturation information/indication may be generated. In response to the saturation information/indication, an operator can implement recovery steps or procedures. For example, an unneeded power supply system (e.g., switchable systems in the second state), may be switched to the first state.

In some example implementations, when the plurality of switchable systems in the first state in the well site are powered off, if the standard-compliant information/indication is received, in response to an overall power demand data may be determined (e.g., input from outside of the power generation systems). The number of operational electric generators needed may be determined by dividing the power demand data by a unit power data of an electric generator followed by a rounding up to the next nearest integer. In other words, the electric power demand by the well site may be divided by the power that can be generated by one power generation system if being switched to, and the result obtained may be rounded up to the next nearest integer. This integer represents the number of the electric generators currently needed. The number of the switchable systems that need to switched to the second state may be derived from this integer number (e.g., by subtracting the currently number of operational electric generator system form this integer number).

Step S130: in response to the standard-compliant information/indication, and based on the fracturing fluid displacement information and the fracturing fluid displacement demand, selecting at least one switchable system from the plurality of switchable systems in the first state to switch to the second state to generate a switching information. Herein the switching information indicates the number and identify of switchable systems to be switched from the first state to the second state.

Figure 19:
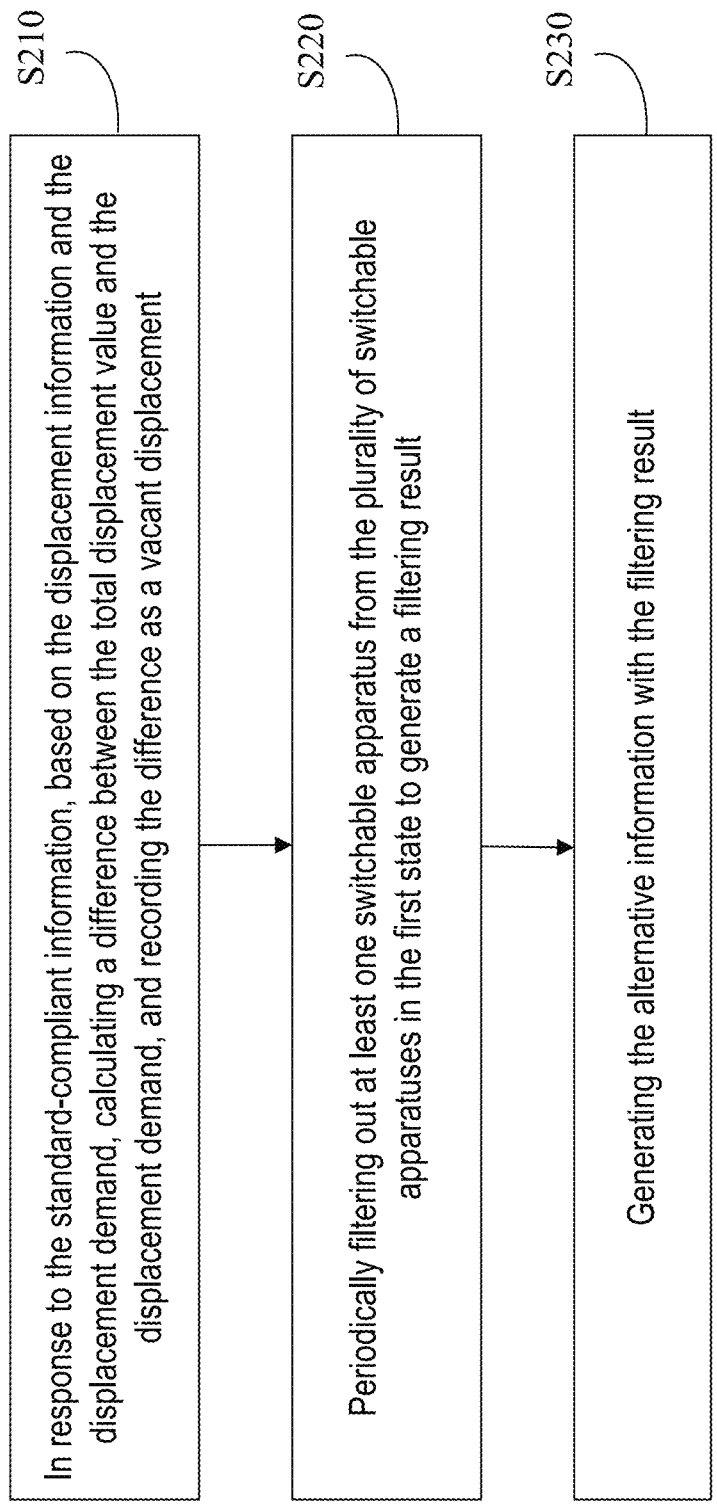
FIG. 19 is a schematic flow chart of another control method of the well site of FIG. 7 as provided according to an embodiment of the present disclosure.

FIG. 19 shows a schematic flow chart of an example control method of the well site as shown in FIG. 17 in accordance with at least one embodiment of the present disclosure. The example control method for the well site as shown in FIG. 19 may include step S210 through step S230. These steps may be implemented to achieve Step S130 of FIG. 18.

Step S210: in response to the standard-compliant information/indication, and based on the fracturing fluid displacement information and the fracturing fluid displacement demand, calculating a difference between the total fracturing fluid displacement value and the fracturing fluid displacement demand, and recording the difference as an excess fracturing fluid displacement.

Step S220: periodically determining at least one switchable system from the plurality of switchable system in the first state to be switched from the first state to the second state. Such determination and the set of switchable system to be switched from the first state to the second state may be referred to as an adjustment scheme.

In some example implementations, the condition for periodically switching operating state of at least one switchable system from the plurality of switchable systems in the first state is as follows: periodically determining the adjustment scheme including at least one switchable systems according to the fracturing fluid displacement data of the plurality of switchable systems (supplied as the fracturing systems) in the first state in an ascending order of fracturing fluid displacement data of the plurality of switchable systems. The at least one switchable system to be switched is determined by evaluating the sum of their fracturing fluid displacement data such that the sum is just smaller than the excess fracturing fluid displacement (including a next switchable system with the next higher fracturing fluid displacement would lead to the sum being higher than the excess fracturing fluid displacement). As such, under the condition that the fracturing fluid displacement demand of the well site is met, a set of switchable systems with the smaller fracturing fluid displacement data are selected to be switched from the first state to the second state for electric power generation. In such a manner, it becomes convenient for an operator of the well site to maintain the compliance status of the fracturing systems with sufficient but not overly excessive fracturing fluid displacement at the wellhead, and the set of switchable systems in the first state (fracturing state) that can be switched to the second state (electric power generation state) without affecting the overall hydraulic fluid discharge requirement can be identified.

Step S230: generating the switching information based on the adjustment scheme. For example, the adjustment scheme may include the set of switchable systems to be switched from the first state to the second state deployed as electric power generation systems. For example, based on the adjustment process and the adjustment condition of the switchable systems in step S220, the adjustment scheme may include relevant information about the switchable systems to be switched from the first state to the second state. Such information, for example, may include but is not limited to the locations of the set of switchable systems to be switched in the well site and/or the number of the corresponding switchable systems. As such, the to-be-switched switchable systems are more quickly identified when they need to be switched.

Step S140: when the number of the switchable systems to be switched in the adjustment scheme and the switching information is greater than a number of the electric generators in demand, modify the adjustment scheme to select a number of switchable systems among the ones in the adjustment scheme with a matching number of the electric generators in demand to generate a replacement adjustment scheme.

In some example implementations, generating the replacement adjustment scheme may include: selecting a number of switchable systems with the same number of the electric generators in demand from the set of switchable systems in the adjustment scheme in an ascending order of the fracturing fluid displacement of the switchable systems in the first state in adjustment scheme and the switching information, and generating the replacement adjusted scheme based on the selected switchable systems having the same number of the electric generators in demand. In other words, if the set of the switchable systems that can be switched to the second state in the adjustment scheme and switching information is greater than the number of the switchable systems that need to be switched to the second state, the switchable systems in the adjustment scheme in the first state with smaller fracturing fluid displacement are preferentially selected and then switched to the second state and deployed as power generation systems.

The control method of the well site provided by the embodiments of the present disclosure above may be implemented to improve the electric power supply capability in the well site while meeting the fracturing fluid displacement demand of the well site.

In some example implementations, as shown in FIG. 17, when the fracturing fluid displacement demand of the well site is met, fracturing and power generation switchable systems at locations that are further away from the wellhead may be preferably chosen to be switched to the second state and deployed as power generation systems, thereby reducing the fracturing fluid displacement transport inefficiency and waste (associated with longer distance transport of the fluid to the wellhead) of the switchable systems, improving energy utilization, and reducing power consumption.

In some example implementations, as shown in FIG. 17, when one of the power supply devices of the fracturing and power generation switchable systems in the well site breaks down and needs other systems to supply power, under the condition that the fracturing fluid displacement demand of the well site is met, the principle of proximity may be adopted to select switchable system that is nearest to the troubled switchable system to switch to the second state as an electric power generation system.

In some example implementations, in response to the replacement adjustment scheme, the selected switchable systems having the same number of electric generators in demand are finally switched to the second state. That is, the selected switchable systems having the same number of required power generation systems are deployed as power generation systems to supply electric power to other switchable systems as the fracturing systems.

In some example implementations, when the number of the switchable systems in the adjustment scheme and switching information is not greater than the number of the electric generators in demand, the replacement adjustment scheme is generated based on all of the switchable systems in the adjustment scheme and the switching information. In such circumstance, a warning may be automatically generated. In other words, when the switchable systems not to be switched ensure the fracturing fluid displacement demand of the well site, other switchable systems can be deployed as electric power generation systems. When the number of the switchable systems that can be switched to and deployed as the power generation systems in the well site is insufficient, and under the condition that the fracturing fluid displacement demand of the well site is met, other switchable systems are all switched to and deployed as electric power generation systems. The staff can deploy other electric generators or electricity sources according to the warning information to meet the electric power supply demand of the switchable system deployed as fracturing system and/or other components and systems of the well site.

It should be noted that the fracturing and power generation switchable systems described in the embodiments of the present disclosure can be switched from the first state to the second state, and can also be switched from the second state to the first state under similar principles. That is, the fracturing and power generation switchable systems can be deployed as either electric power generation systems or fracturing systems, and can be flexibly switched (or swapped), depending on a real-time or periodically evaluated fracturing fluid demand and electric power demand. In other words, the combined platform including the plurality of switchable systems provide power to both the fracturing operation and electric power for the operating the switchable systems when they operate as a fracturing system. The plurality of switchable systems may be allocated for either fracturing operation or electric power generation based on the demand for fracturing fluid and electric power demand of the combined platform. The switchability or swappability provided by the various embodiment above offer a flexibility in balancing the two demands, allowing for real-time or periodic monitoring of both fracturing fluid data and the electric power demand and optimally select from the plurality of switchable system to switch form the first state to the second state, or from the second state to the first state.

Figure 20:
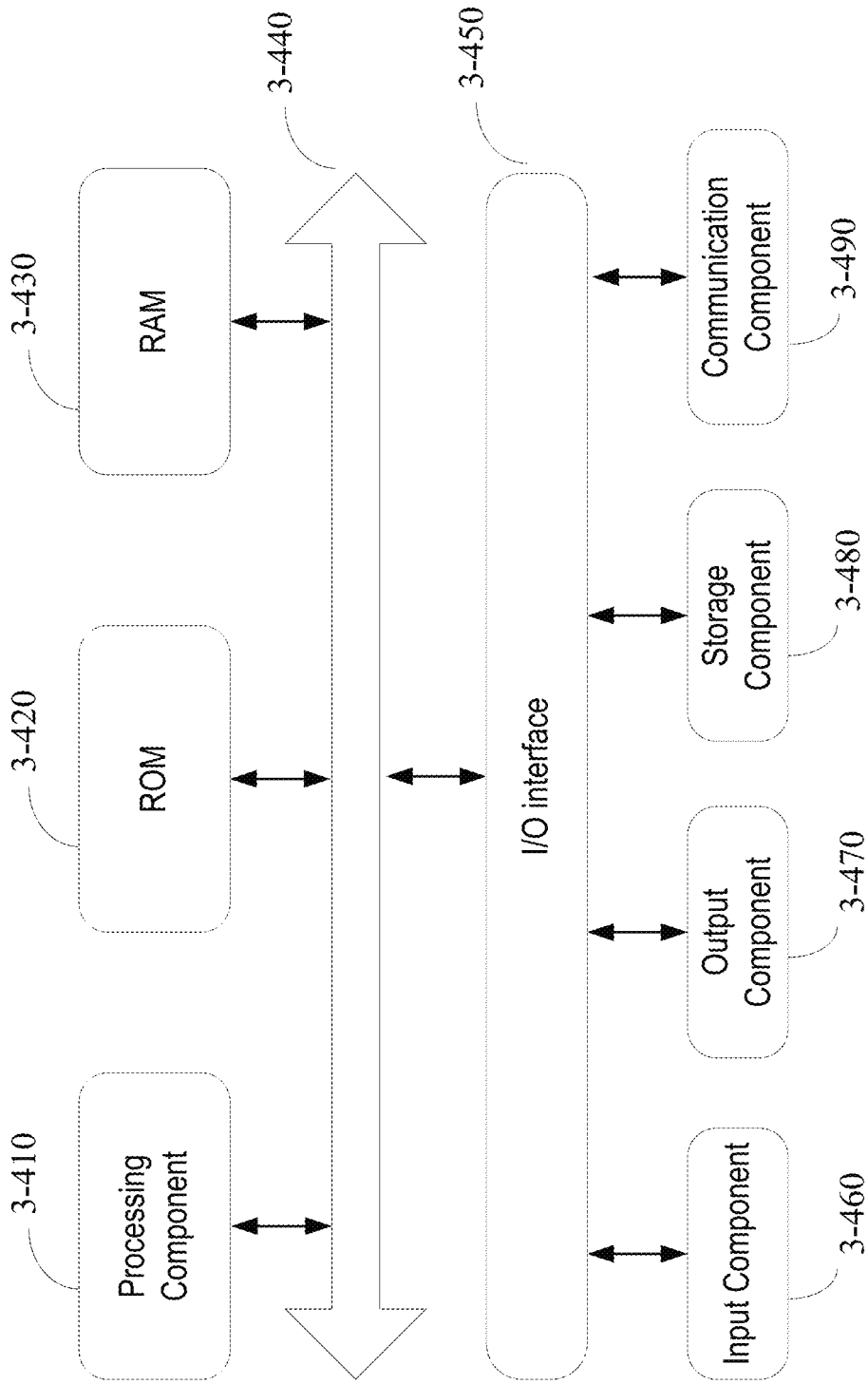
FIG. 20 shows a structural schematic diagram of an example control device as provided according to an embodiment of the present disclosure.

FIG. 20 shows a structural schematic diagram of an example control device used in the well site in accordance with at least one embodiment of the present disclosure.

The example control device 3-400 for the well site shown in FIG. 20 may be configured to implement the control method of the well site in accordance with the embodiments of the present disclosure. The control device 3-400 used for the well site may be implemented as a terminal device such as a personal computer, a notebook computer, a tablet computer, and a mobile phone, a workstation, a server, or a cloud service, etc. It should be noted that the control device 3-400 used for the well site as shown in FIG. 20 is merely one non-limiting example.

As shown in FIG. 20, the control device 3-400 used in the well site may include a processing unit (such as a central processing unit, a graphics processor, etc.) 3-410, which can perform various actions and processes according to a computer program stored in a read-only memory (ROM) 3-420 or a program loaded from a storage unit 3-480 into a random-access memory (RAM) 3-430. In the RAM 3-430, various programs and data relevant to the operation of the control device 3-400 of the well site are also stored. The processing unit 3-410, the ROM 3-420, and the RAM 3-430 communicate with each other through one or more buses 3-440. An input/output (I/O) interface 3-450 is also connected with the bus 3-440.

Generally, the following components can be connected with the I/O interface 3-450: an input component 3-460 including but not limited to a touch screen, a touch pad, a keyboards, a mouse, a camera, a microphone, an accelerometer, and a gyroscope, and the like; an output component 3-470 including but not limited to a liquid crystal display (LCD), a speaker, and a vibrator, and the like; a storage component 3-480 including but not limited to a magnetic tape, a hard disk, a solid-state storage, and the like; and a communication component 3-490. The communication component 3-490 may allow the control device 3-400 used for the well site to exchange data and/or commands with other electronic components through wireless communication or wired communication. Although FIG. 20 shows a control device 3-400 for a well site including various components, it should be understood that it is not required that all the components as shown in FIG. 20 be included.

The control device 3-400 used for the well site may alternatively be implemented with more or fewer components as shown in FIG. 20.

In some example implementations according to the embodiments of the present disclosure, the above-mentioned control method of the well site may be implemented as a computer software program. For example, the embodiments of the present disclosure may include a computer program product, which includes a computer program stored on a non-transitory computer readable medium. The computer program includes program includes codes for executing the above-mentioned control method of the well site. In such an embodiment, the computer program may be downloaded and installed from the network through the communication unit 3-490, and can be installed from the storage unit 3-480, or can be installed from the ROM 3-420. When the computer program is executed by the processing unit 3-410, the functions defined in the control method of the well site provided by the embodiments of the present disclosure can be performed.

In some other example implementations of the present disclosure, a storage medium is further provided. The storage medium may be configured to store non-transitory computer program executable codes (such as computer executable instructions). When the non-transitory computer program executable codes are executed by a processor, the control method of the well site according to any embodiments of the present disclosure can be realized.

Figure 21:
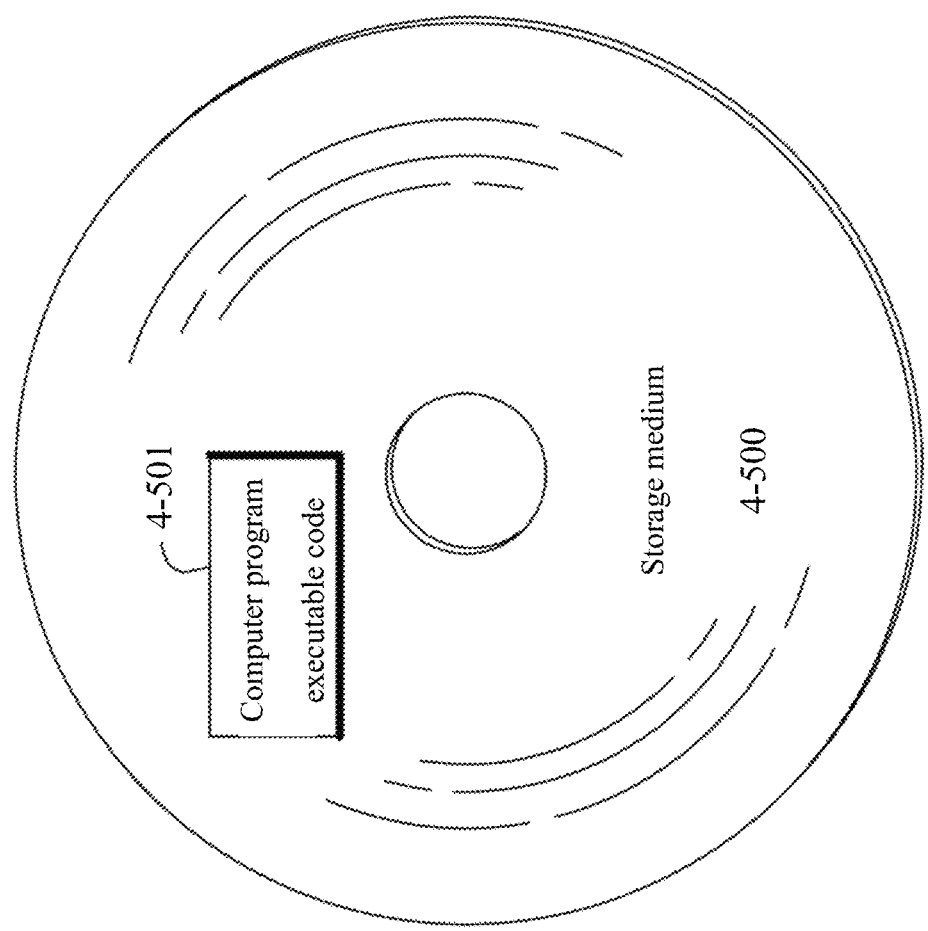
FIG. 21 shows a schematic diagram of an example storage medium as provided according to an embodiment of the present disclosure.

FIG. 21 is a schematic diagram of a storage medium in accordance with at least one embodiment of the present disclosure. As shown in FIG. 21, the storage medium 4-500 may non-temporarily stores computer program executable codes 4-501. when the computer program executable codes 4-501 are executed by a computer, one or more steps in the control method of a well site described above may be executed.

For example, the storage medium 4-500 may be applied to the above-mentioned control device 3-400 of the well site. For example, the storage medium 4-500 may be a memory 3-420 in the control device 3-400 of the well site as shown in FIG. 20. The function of the code included in the storage medium 4-500 are described in the various embodiments above.

Figure 22:
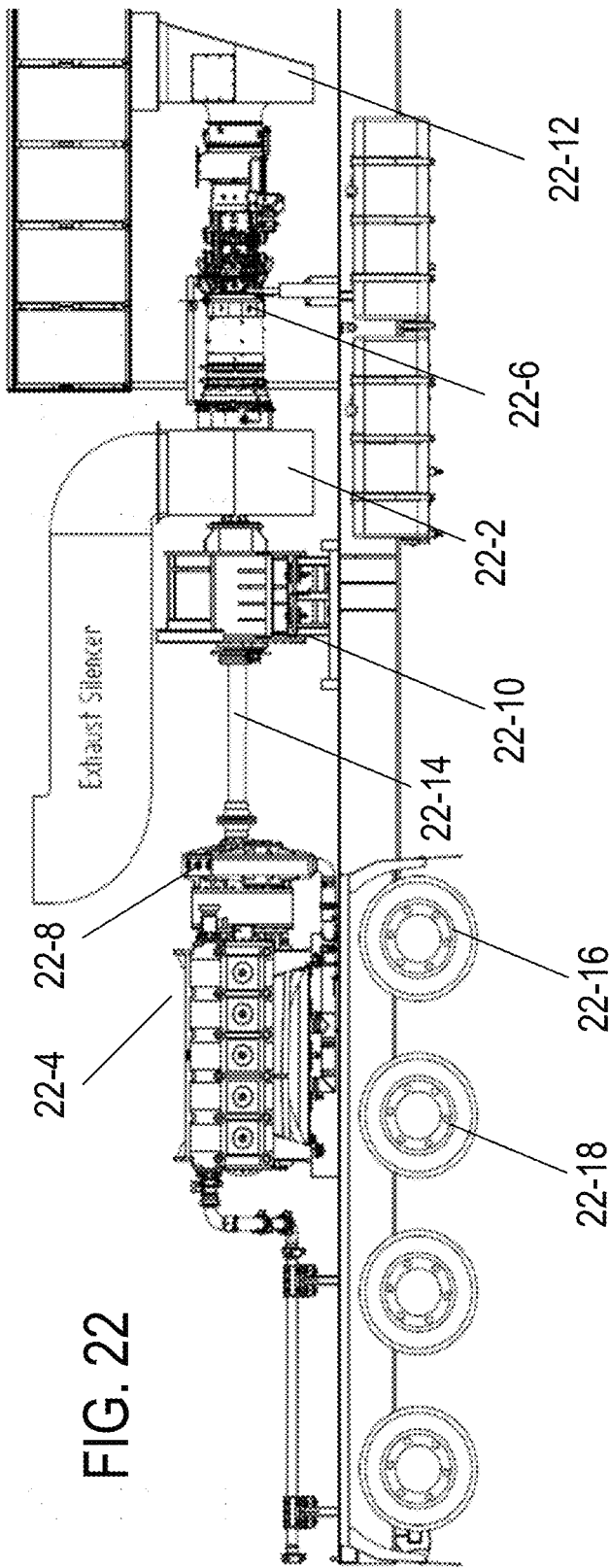
FIG. 22 shows a back portion of an example semi-trailer turbine based fracturing system.
Figure 23:
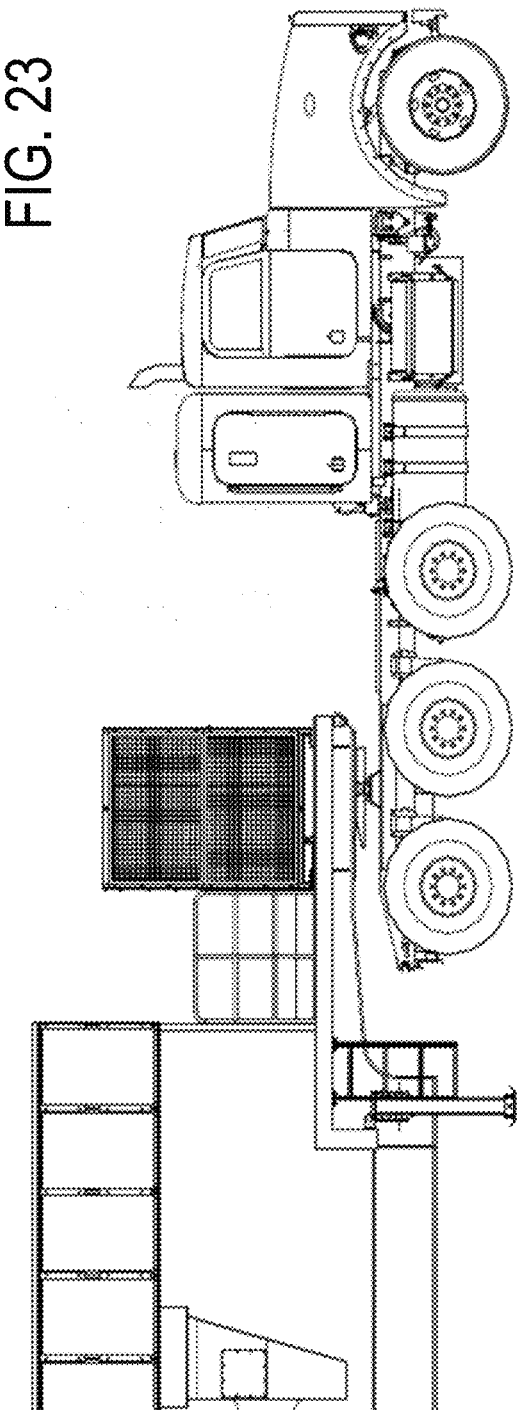
FIG. 23 shows a front portion of the semi semi-trailer turbine based fracturing system of FIG. 22.

Finally, FIGS. 22-23 show a front portion and a back portion of a fracturing system disposed on a semi-trailer platform. As shown in FIGS. 22-23, the fracturing system is based on a turbine engine (or turbine) 22-6 that drives a plunger pump 22-4 for pumping fracturing fluid to a wellhead. The driving power output port of the turbine engine 22-6 may be coupled to a reduction gearbox 22-10 through an exhaust section 22-2 of the turbine pump. The exhaust section is configured to receive the combustion exhaust gas from the turbine engine and is further connected upwards to an exhaust duct that guide the combustion exhaust from the turbine engine away from the intake side 22-12 of the turbine engine. Example construction and component of the exhaust section and exhaust duct is descried above in this disclosure.

The coupling between the reduction gearbox 22-10 and the driving power output end of the turbine engine may be based on a through-shaft. The through-shaft may pass through a channel or cavity in the exhaust section 22-2. For example, the channel or cavity for inserting the shaft may be through a volute in the exhaust section, as descried above.

As further shown in FIGS. 22-23, another shaft 22-14 may be installed between the reduction gearbox 22-10 and the plunger pump 22-4. In some implementations, the plunger pump 22-4 may include an integrated reduction gearbox 22-8. The shaft 22-14, thus may be configured to couple either direct to the plunger pump 22-4 or indirectly to the plunger pump 22-4 through the integrated reduction gearbox 22-8. The reduction gearboxes 22-10 and 22-8, if both employed, may thus operate collectively to reduce the rotational speed at the driving power output end of the turbine engine 22-6 to the input of the plunger pump 22-4.

In some implementations, the plunger pump 22-4 may be fixedly installed on the semi-trailer platform. The plunger pump 22-4 may be installed such that at least one set of wheels of the semi-trailer, such as wheel set 22-18 and wheel set 22-16 are directly beneath the plumber pump 22-4 when viewed from the side of the semi-trailer. In some implementations, the plunger pump 22-4 may be disposed/installed on the semi-trailer such that two sets of wheels are directly under it when viewed from the side, as shown in FIG. 22. In some implementations, the center of mass of the plunger pump may be directly on top of one set of wheels when viewed from the side. In some other implementations, the center of mass of the plunger pump 22-4 may be located at a center between two sets of wheels when viewed from the side. The purpose of the example implementations above is to provide a stable support to the plunger pump 22-4 by the semi-trailer platform.

In some implementations, the reduction gearbox 22-10 and the shaft 22-14 connected thereto may be configured as removable components on the semi-trailer platform. The reduction gearbox 22-10 may be configured to be easily movable in the field. Other auxiliary components may be included on the semi-trailer platform for assisting in removing and hoisting the reduction gearbox 22-10 when needed.

Figure 24:
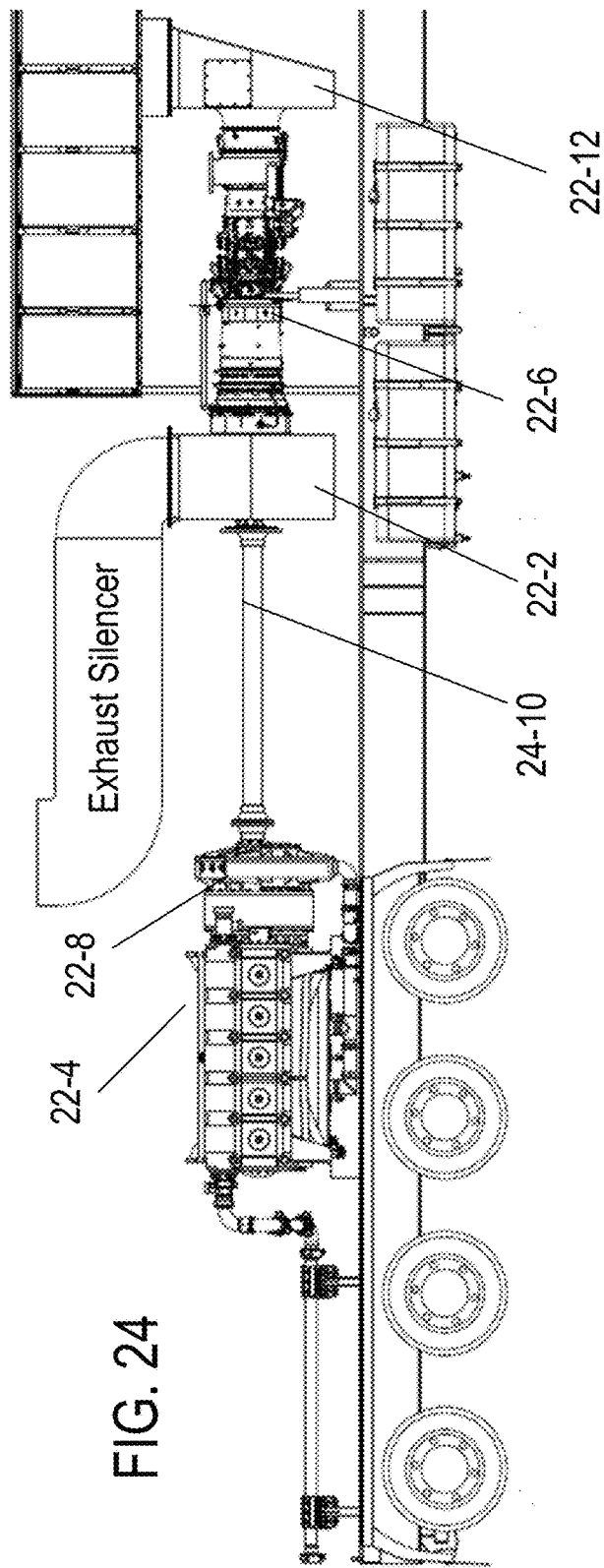
FIG. 24 shows a back portion of another example semi-trailer turbine based fracturing system.
Figure 25:
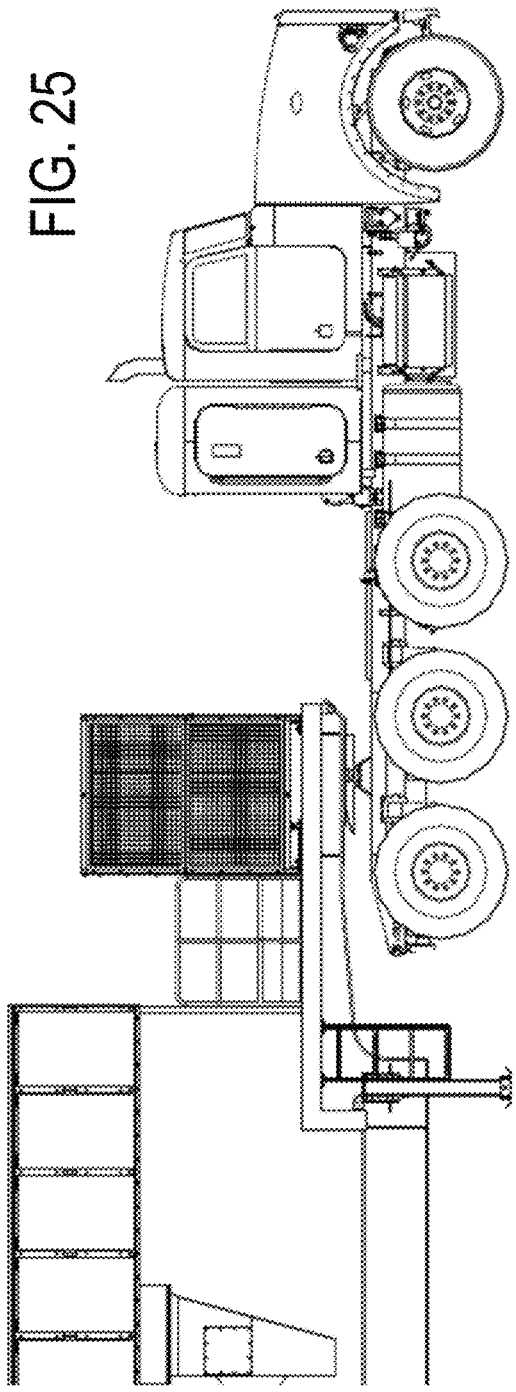
FIG. 25 shows a front portion of the semi semi-trailer turbine based fracturing system of FIG.

With the reduction gearbox 22-10 and the shaft 22-14 are removed, the system of FIGS. 22-23 may be converted into another configuration, as shown in FIGS. 24-25. In particular, as shown in FIGS. 24-25, once the reduction gearbox 22-10 and the shaft 22-14 of FIGS. 22-23 are removed, another shaft 24-10 may replace the shaft 22-10 of FIGS. 22-23 and be disposed and connected between the plunger pump 22-4 (or the integrated gearbox 22-8 of the plunger pump) and the exhaust section 22-2. For example, the through-shaft described above as passing through the exhaust section 22-2 may be configured as couplable at its exit at the exhaust section 22-2. The shaft 24-10 may be installed by coupling it to the through-shaft at one end and the plunger pump 22-4 or the integrated reduction gearbox 22-8 at the other end. Example coupling mechanisms between rotational shafts are described above.

In some other implementations, the through-shaft and the shaft 24-10 may be implemented as a single driving shaft. As such, after the reduction gearbox 22-10 and the shaft 22-14 in FIGS. 22-23 are removed, the through-shaft can also be removed. A single shaft may be inserted through the through-channel or cavity in the exhaust section 22-10 and may be connected to the driving power output end of the turbine engine 22-6 at one end and the plunger pump 22-4 or the integrated reduction gearbox 22-8 at the other end.

The configurable system above may thus provide flexibility in operation. For example, in some situations the integrated reduction gearbox 22-8 may be sufficient for speed reduction and in such situation, the reduction gearbox 22-10 may be removed, and set aside for reinstallation when called for in a different operational circumstance.

Additional embodiments are described below with respect to FIGS. 26-30.

Additional Embodiment 1

Figure 26:
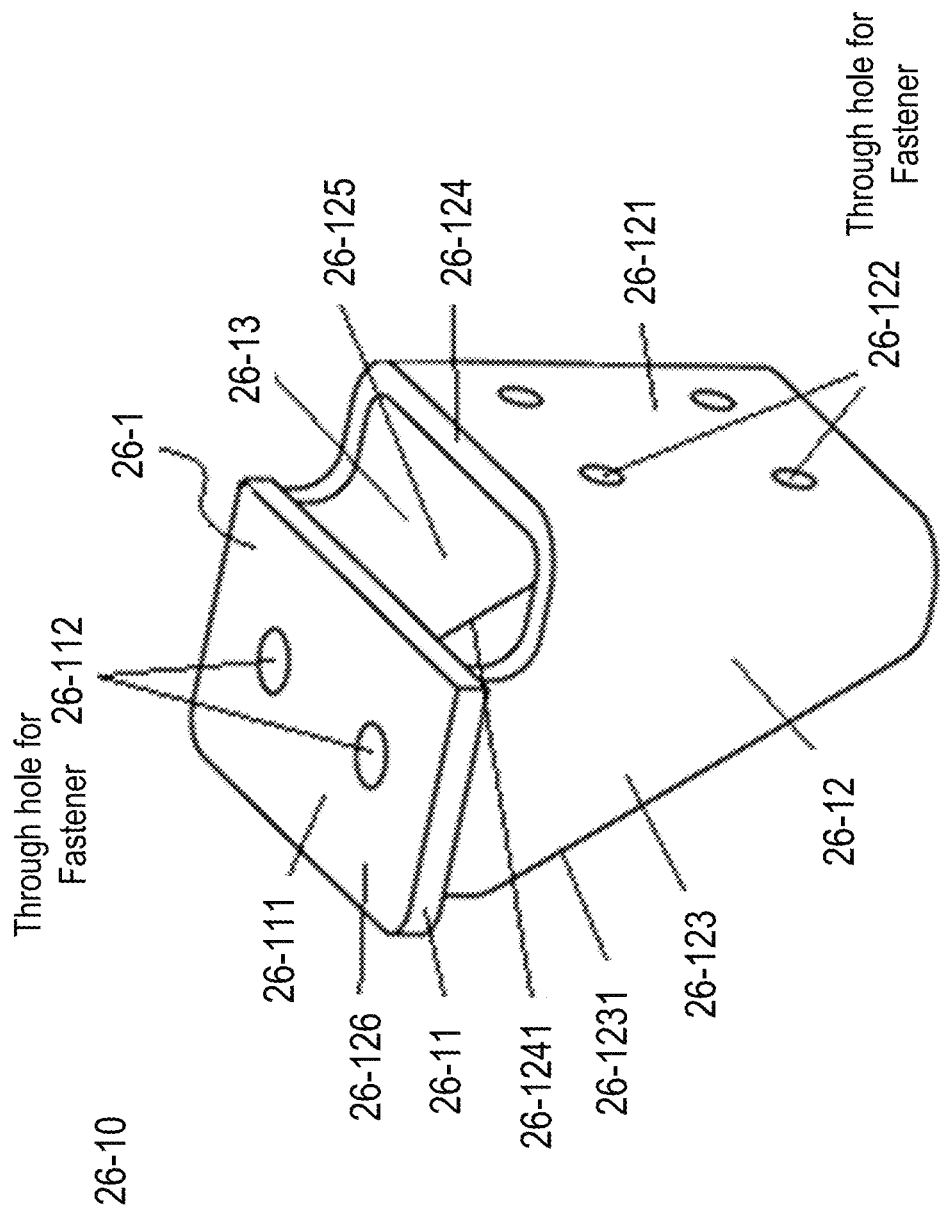
FIG. 26 illustrates a schematic diagram of a three-dimensional structure of an embodiment of a connecting structure according to the disclosure.
Figure 27:
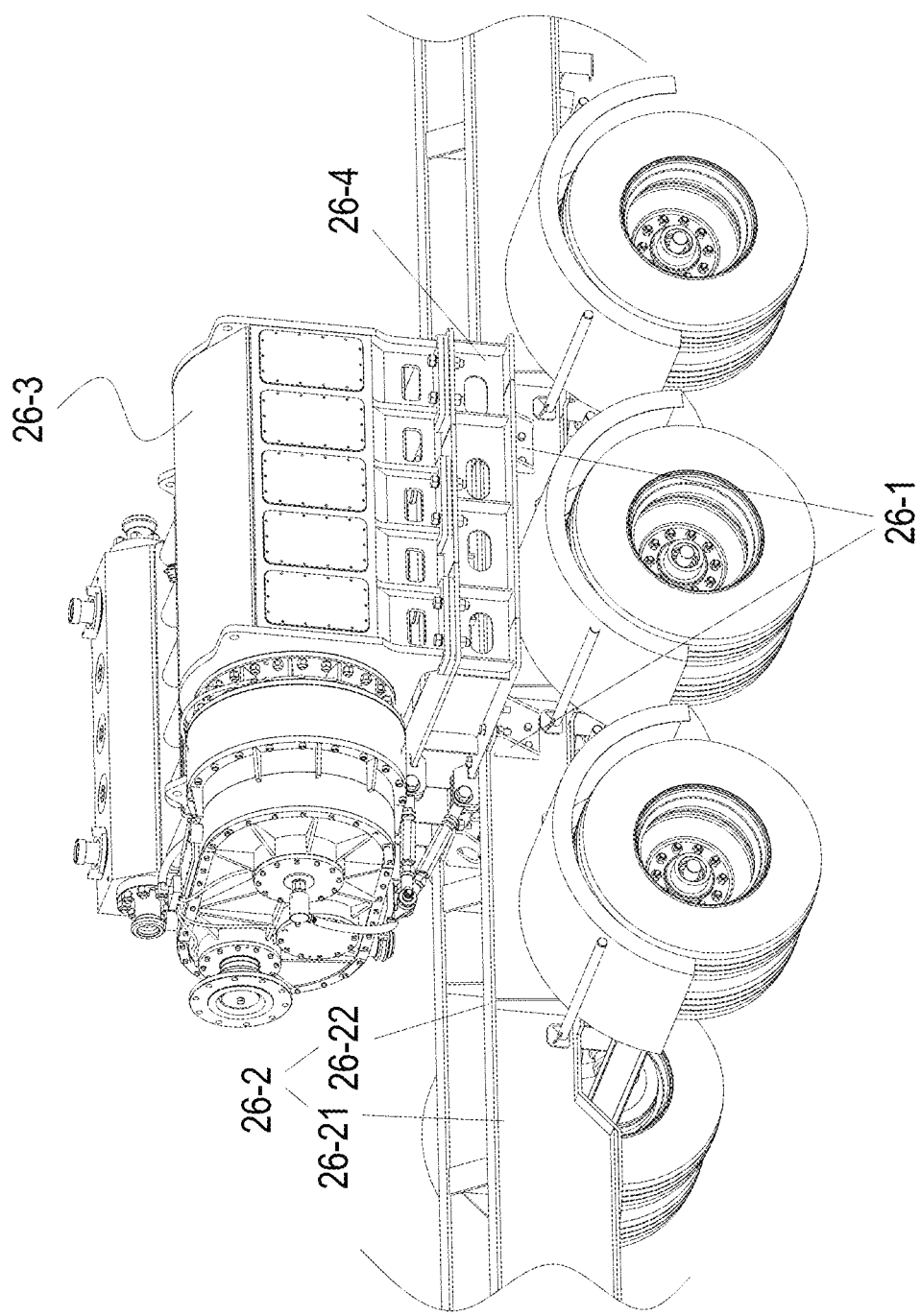
FIG. 27 illustrates a schematic diagram of a three-dimensional structure of a plunger pump device mounted on a beam body according to Embodiment 1 of the disclosure.
Figure 28:
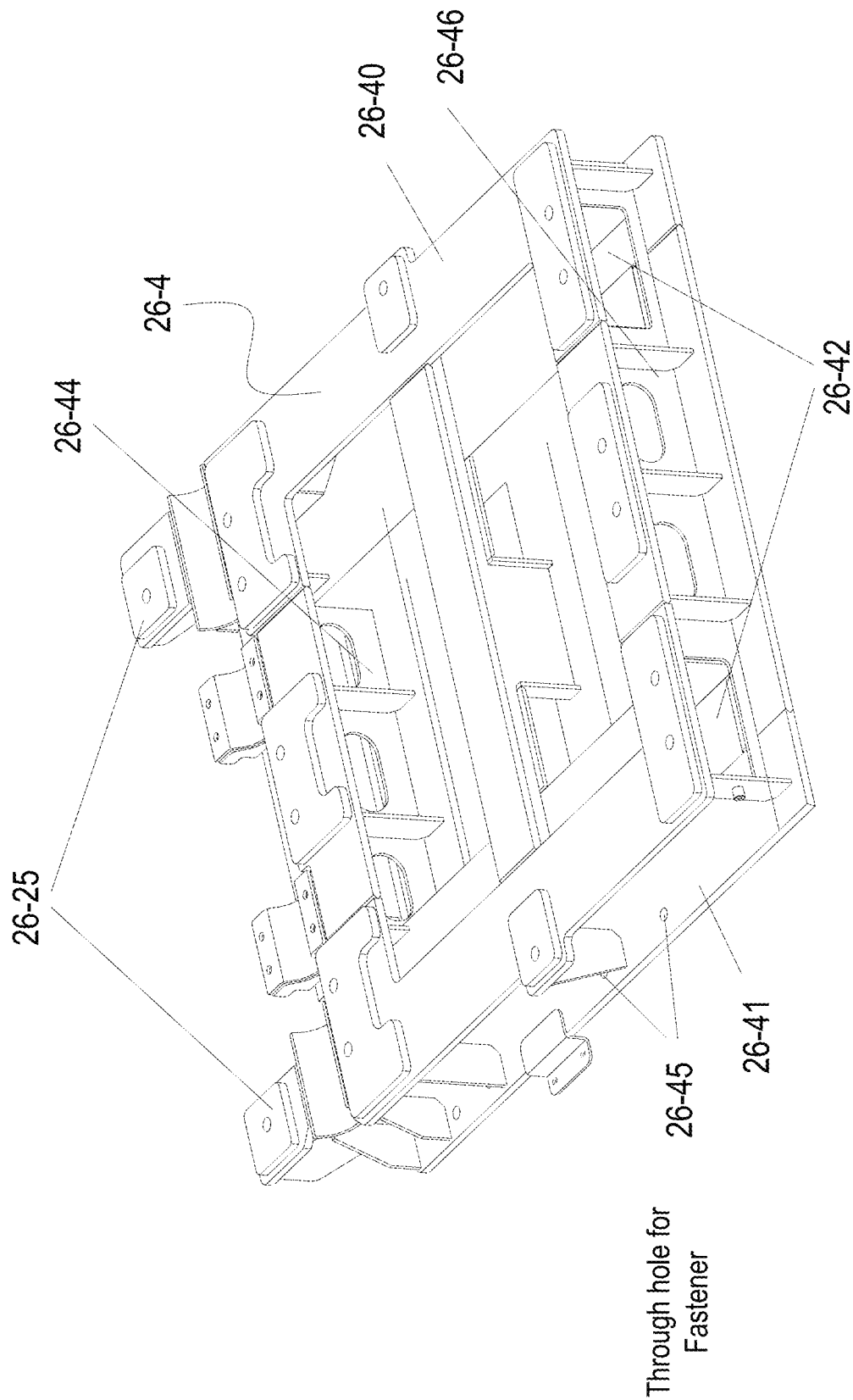
FIG. 28 illustrates a schematic diagram of a three-dimensional structure of a base of the plunger pump device in FIG. 27.

As shown in FIGS. 26-28, the connecting structure is used for connecting a bottom and a beam body 26-2, wherein the beam body 26-2 includes a beam main body 26-21 and a wing plate 26-22, and the connecting structure includes a connecting body 26-10 of FIG. 26, the connecting body 26-10 includes a first connecting portion 26-11 and a second connecting portion 26-12 which are connected with each other, the first connecting portion 26-11 has a first surface 26-111, the second connecting portion 26-12 has a second surface 26-121, and the first surface 26-111 is used for mounting the bottom, and the second surface 26-121 is used for mounting the beam main body 26-21. A first angle is formed between the first surface 26-111 and the second surface 26-121, and a wing plate mounting space 26-13 is formed between the first connecting portion 26-11 and the second connecting portion 26-12.

By applying the technical solution of this embodiment, a bottom is connected with a beam body 26-2 by connecting structures 26-1, and a connecting body 26-10 of each connecting structure 26-1 includes a first connecting portion 26-11 and a second connecting portion 26-12 which are connected with each other, and a wing plate mounting space 26-13 is formed between the first connecting portion 26-11 and the second connecting portion 26-12, so as to avoid a wing plate 26-22 of the beam body 26-2, and ensure that the connecting structures 26-1 can be mounted on the beam body 26-2; wherein a first surface 26-111 of the first connecting portion 26-11 is configured to mount the bottom, and a second surface 26-121 of the second connecting portion 26-12 is configured to mount the beam main body 26-21, the first connecting portion 26-11 and the second connecting portion 26-12 are arranged at a first angle, to connect the bottom and the beam body 26-2 in different directions. In this way, both the first connecting portion 26-11 and the bottom, and the second connecting portion 26-12 and the beam body 26-2 are detachably connected, so that working personnel detaches the bottom from the beam body 26-2, thereby solving the problem in an art known to inventors that the poor mounting and detachment flexibility of a plunger pump base, and reducing the mounting and detachment costs of a plunger pump.

Compared with the method of connecting a beam body and a plunger pump base by welding in an art known to inventors, in the present embodiment, the bottom is detachably connected with the beam body 26-2 by means of connecting structures 26-1, which, on the one hand, reduces the mounting difficulty and labor intensity of working personnel, and on the other hand, makes the bottom detachable from the beam body 26-2, thereby effectively improving the flexibility of mounting and detachment of the bottom, and also facilitating replacement of the bottom by working personnel.

In some embodiments, the first surface 26-111 is a flat surface; or the second surface 26-121 is a flat surface; or each of the first surface 26-111 and the second surface 26-121 is flat surface. In this way, the first surface 26-111 and the second surface 26-121 are flat surfaces and can be adapted to an assembly surface between the bottom and the beam main body 26-21, thereby increasing the contact area between the bottom and the first surface 26-111, and the contact area between the beam main body 26-21 and the second surface 26-121, improving the assembly tightness between the connecting structures 26-1 and the bottom and the beam main body 26-21, and preventing the working performance of working equipment from being affected due to the vibration generated by an assembly gap. In addition, the arrangement above makes the structure of the connecting body 26-10 simpler and easy to machine and implement, thereby reducing the machining cost and machining difficulty of the connecting structure.

In this embodiment, the first surface 26-111 and the second surface 26-121 are both flat surfaces. In this way, an assembly surface between the first surface 26-111 and the bottom which is also a flat surface, and an assembly surface between the second surface 26-121 and the beam main body 26-21 which is also a flat surface can be more tightly fitted together, so as to reduce the vibration between the connecting structures 26-1 and the bottom, and between the connecting structures 26-1 and the beam main body 26-21, preventing the connecting structures from loosening or even falling off due to the vibration, thereby further improving the assembly reliability of the connecting structures 26-1.

In some embodiments, the first surface 26-111 has a first through hole 26-112, and a first fastener pass through the first through hole 26-112 and the bottom, to connect the bottom and the connecting structure 26-1; or, the second surface 26-121 has a second through hole 26-122, and a second fastener pass through the second through hole 26-122 and the beam main body 26-21, to connect the beam main body 26-21 and the connecting structure 26-1. In this way, the connecting structure 26-1 is connected with the beam main body 26-21 and the bottom by the fastener, so as to achieve a connecting function of the connecting structure 26-1. In addition, connection by fastener can reduce the machining cost of the connecting structure 26-1, facilitating mounting and detachment.

In some embodiments, the first fasteners are bolts or screws, and the second fasteners are bolts or screws.

In this embodiment, the first surface 26-111 has a first through hole 26-112, and the second surface 26-121 has a second through hole 26-122. In this way, working personnel only needs to make a plurality of bolts pass through the first through hole 26-112 and the bottom, and the second through hole 26-122 and the beam main body 26-21, then screws nuts onto the bolts in a clockwise direction, to complete assembly between the connecting structure 26-1 and the bottom, and between the connecting structure 26-1 and the beam main body 26-21; or the working personnel unscrews nuts from assembled bolts in a counterclockwise direction, thereby completing detachment between the connecting structure 26-1 and the bottom, and between the connecting structure 26-1 and the beam main body 26-21. In this way, the arrangement above makes the mounting and detachment process of the connecting structures 26-1 simpler, and reduces the operation difficulty of the working personnel.

As shown in FIGS. 26-28, the second connecting portion 26-12 includes a first plate body 26-123, a second plate body 26-124, a third plate body 26-125 and a fourth plate body; the third plate body 26-125 is disposed opposite the first plate body 26-123, the first plate body 26-123 is connected with the third plate body 26-125 by the second plate body 26-124; a second angle is formed between the first plate body 26-123 and the second plate body 26-124, and a third angle is formed between the second plate body 26-124 and the third plate body 26-125. The plate surface of the second plate body 26-124 away from the first plate body 26-123 is the second surface 26-121. The first connecting portion 26-11 is the fourth plate body 26-126; the first plate body 26-123, the second plate body 26-124, the third plate body 26-125 and the fourth plate body 26-126 enclose to form an opening, and the opening is the wing plate mounting space 26-13; the first plate body 26-123 and the third plate body 26-125 are both connected with the plate surface of the fourth plate body 26-126, and the plate surface of the fourth plate body 26-126 away from the first plate body 26-123 is the first surface 26-111. In this way, by the arrangement above, on the one hand, the first plate body 26-123, the second plate body 26-124, the third plate body 26-125 and the fourth plate body 26-126 enclose to form the wing plate mounting space 26-13, to avoid the wing plate, so that the connecting structure 26-1 can be disposed on the beam body 26-2, thereby achieving a connecting function of the connecting structure 26-1; and on the other hand, the second connecting portion 26-12 has a simpler structure, and is easy to machine and implement, thereby reducing the machining difficulty of the working personnel and the machining cost of the second connecting portion 26-12.

In this embodiment, the second angle and the third angle are both 90°, the first plate body 26-123 and the third plate body 26-125 are arranged in parallel, and the first plate body 26-123 is arranged perpendicular to both the second plate body 26-124 and the fourth plate body 26-126. In this way, by the arrangement above, on the one hand, the first plate body 26-123 and the third plate body 26-125 can evenly bear the weight of the bottom, to avoid deformation and damage of the first plate body 26-123 or the third plate body 26-125 caused by excessive stress, thereby improving the bearing capacity of the connecting structure 26-1; on the other hand, force directions of the first plate body 26-123 and the third plate body 26-125 which are arranged perpendicular to both the second plate body 26-124 and the fourth plate body 26-126 are consistent with the extension directions of the first and third plate bodies, so as to avoid a component force in the horizontal direction which causes twisting and deformation thereof, thereby further improving the bearing capacity of the connecting structure 26-1.

In some embodiments, the first plate body 26-123, the second plate body 26-124 and the third plate body 26-125 are formed by sequentially bending one plate body, so as to improve the overall structural strength of the second connecting portion 26-12, and reduce the machining cost of the second connecting portion 26-12.

In some embodiments, an end face of the first plate body 26-123 away from the second plate body 26-124 is a first inclined surface 26-1231; or an end face of the third plate body 26-125 away from the second plate body 26-124 is a second inclined surface 26-1241; or an end face of the first plate body 26-123 away from the second plate body 26-124 is a first inclined surface 26-1231; or an end face of the third plate body 26-125 away from the second plate body 26-124 is a second inclined surface 26-1241. In this way, on the one hand, the arrangement above of the first inclined surface 26-1231 and the second inclined surface 26-1241 can avoid other components and parts, so as to avoid motion interference generated between the connecting structure 26-1 and other components and parts during the operation of the equipment, thereby improving the use reliability of the connecting structure 26-1; and on the other hand, the first plate body 26-123 and the second plate body 26-124 having inclined surfaces are of triangular structures, thereby improving the structural strength of the first plate body 26-123 and the second plate body 26-124, and improving the bearing capacity of the connecting structure 26-1.

In this embodiment, the end faces of the first plate body 26-123 and the second plate body 124 are both inclined surfaces, so that both the first plate body 26-123 and the second plate body 26-124 have triangular structures, thereby improving the structural strength of the first plate body 26-123 and the second plate body 26-124, and further improving the bearing capacity of the connecting structure 26-1.

As shown in FIGS. 27 and 28, the disclosure further provides a plunger pump device; the plunger pump device includes a plunger pump body 26-3, a connecting structure 26-1 and a base 26-4, wherein the plunger pump body 26-3 is disposed on the base 26-4, and the base 26-4 is disposed on a first surface 26-111 of the connecting structure 26-1; and the base 26-4 has a bottom. The connecting structure 26-1 is the described connecting structure 26-1. In this way, the base 26-4 can be detachably connected with the beam body 26-2 by the connecting structure 26-1, thereby improving the flexibility of mounting and detachment of the base 26-4.

In some embodiments, the base 26-4 includes a base body 26-40 and a plurality of connecting members 26-25, and the plunger pump body 26-3 and the connecting structures 26-1 are positioned at both sides of the base body 26-40 respectively. The plurality of connecting members 26-25 are disposed on the base body 26-40 at intervals along a length direction of the base body 26-40; or the plurality of connecting members 26-25 being disposed on the base body 26-40 at intervals along a width direction of the base body 26-40; or one part of connecting members 26-25 being disposed on the base body 26-40 at intervals along a length direction of the base body 26-40, and the other part of connecting members 26-25 being disposed on the base body 26-40 at intervals along a width direction of the base body 26-40, and the plunger pump body 26-3 is connected with the base body 26-40 by the connecting members. In this way, the plurality of connecting members 26-25 not only can achieve the connection between the base 26-4 and the plunger pump body 26-3, but also can increase the assembly area between the plunger pump body 26-3 and the base 26-4, so as to improve the connection stability between the two. In addition, the arrangement above makes the arrangement positions of the connecting members 26-25 more flexible and diverse, so as to adapt to different working conditions and use requirements, and also improve the machining flexibility of working personnel.

In this embodiment, the plurality of connecting members 26-25 are arranged at intervals along the length direction of the base body 26-40 and arranged on one side of the base body 26-40. In this way, the arrangement above enables the assembly position of the base body 26-40 to be adapted to the assembly position of the plunger pump body 26-3, thereby further improving the assembly stability between the two.

In some embodiments, the base body 26-40 includes a first base body section 26-41, a second base body section 26-42, a third base body section and a fourth base body section 26-44 which are connected in an end-to-end manner, wherein the first base body section 26-41 is disposed opposite the third base body section, and the second base body section 26-42 is disposed opposite the fourth base body section 26-44. The base body 26-40 has a third through hole 26-45 and a fork avoidance slot 26-46; a third fastener pass through the first through hole 26-112 of the connecting structure 26-1 and the third through hole 26-45, to connect the connecting structure 26-1 and the base 26-4. The third through hole 26-45 is disposed on the first base body section 26-41; or the third through hole 26-45 is disposed on the third base body section; or the third through hole 26-45 is disposed on the first base body section and the third base body section, and the fork avoidance slots 26-46 are provided on the second base body section 26-42; or the fork avoidance slot 46 is disposed on the fourth base body section 26-44; or the fork avoidance slot 26-46 is disposed on the second base body section 26-42 and the fourth base body section 26-44. In this way, by the arrangement above, on the one hand, a forklift can insert forks into the fork avoidance slot 26-46, so as to lift the base 26-4 and then transport the base 26-4; on the other hand, interference between the base 26-4 on which the connecting structure 26-1 are mounted and the insertion process of the forks of the forklift can be avoided, facilitating transportation of the base 26-4 by the forklift. In addition, the arrangement above makes the arrangement positions of the third through hole 26-45 and the fork avoidance slot 26-46 more flexible and diverse, so as to adapt to different working conditions and use requirements, and also improve the machining flexibility of working personnel.

In this embodiment, the third through hole 26-45 is disposed on the first base body section 26-41 and the third base body section, and the third through hole 26-45 disposed on the first base body section 26-41 and the third base body section are symmetrically arranged, so that the plurality of connecting structure 26-1 can be symmetrically disposed on the first base body section 26-41 and the third base body section, thereby enabling the plurality of connecting structures 26-1 to evenly bear the gravity of the base 26-4 and the plunger pump body 26-3, so as to improve the connection stability between the plunger pump body 26-3 and the beam body 26-2.

In the present embodiment, the fork avoidance slot 26-46 is disposed on the second base body section 26-42 and the fourth base body section 26-44, and the fork avoidance slot 26-46 on the second base body section 26-42 and the fourth base body section 26-44 form through hole, so that the forks of the forklift can be completely inserted into the base 26-4 to increase the contact area between the forks and the base 26-4, thereby improving the transport stability of the base 26-4 by the forklift.

Additional Embodiment 2

The connecting structure in Embodiment 26-2 differs from the connecting structure in Embodiment 26-1 in that: the application fields of the two are different.

Figure 29:
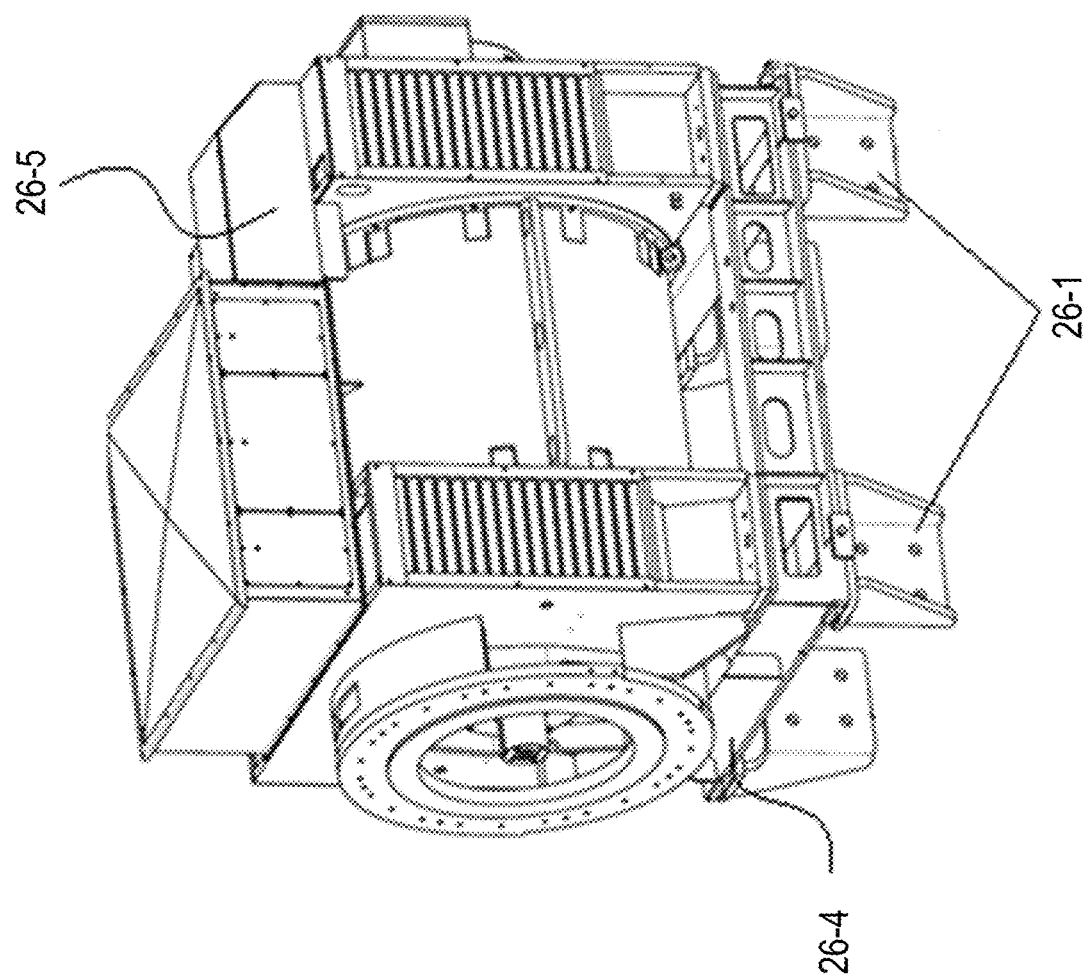
FIG. 29 illustrates a schematic diagram of a three-dimensional structure of a generator device according to Embodiment 2 of the disclosure.

As shown in FIGS. 26 and 29, the present disclosure also provides a generator device; the generator device includes a generator body 26-5, a connecting structure 26-1 and a base 26-4, wherein the generator body 26-5 is disposed on the base 26-4, and the base 26-4 is disposed on a first surface 26-111 of the connecting structures 26-1. The base 26-4 has a bottom. The connecting structure 26-1 is the described connecting structure 26-1. In this way, the arrangement above enables the base 26-4 to be detachably connected with the beam body 26-2, thereby improving the flexibility of mounting and detachment of the base 26-4.

Additional Embodiment 3

The generator device in Embodiment 3 differs from the generator device in Embodiment 2 in that: the mounting manners of the generator body 26-5 are different.

Figure 30:
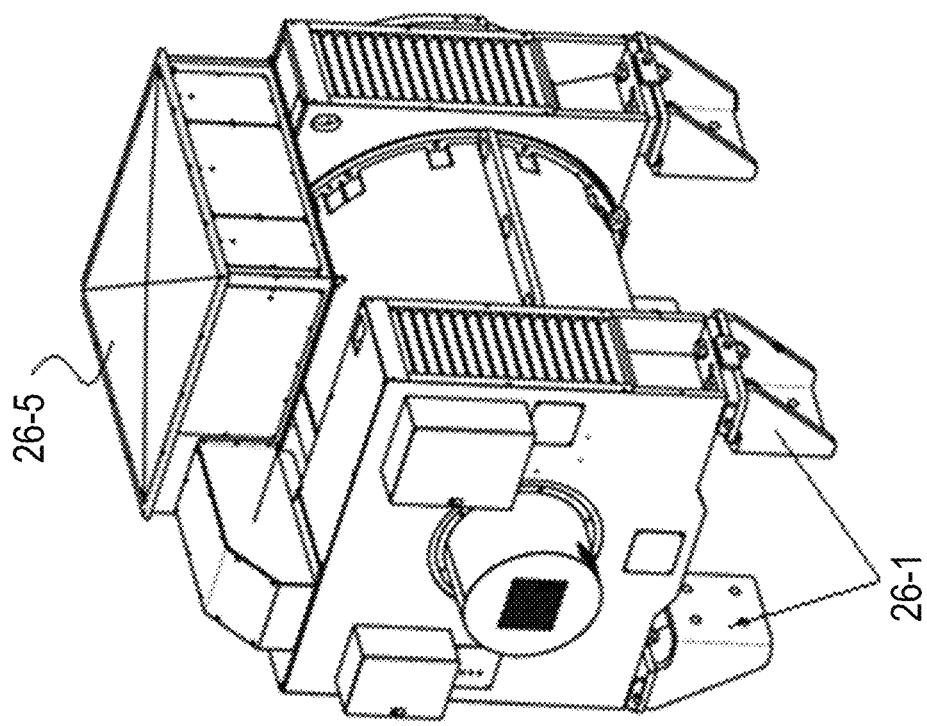
FIG. 30 illustrates a schematic diagram of a three-dimensional structure of a generator device according to Embodiment 3 of the disclosure.

As shown in FIGS. 26 and 30, the disclosure further provides a generator device; the generator device includes a generator body 26-5 and a connecting structure 26-1; the generator body 26-5 is disposed on a first surface 26-111 of the connecting structure 26-1. The position where the generator body 26-5 is connected with the first surface 26-111 is a bottom. The connecting structure 26-1 is the described connecting structure 26-1.

From the description above, it can be determined that the embodiments of the disclosure achieve the following technical effects:

a bottom is connected with a beam body by connecting structures, and a connecting body of each connecting structure includes a first connecting portion and a second connecting portion which are connected with each other, and a wing plate mounting space is formed between the first connecting portion and the second connecting portion, so as to avoid a wing plate of the beam body, such that the connecting structures can be disposed on the beam body; wherein a first surface of the first connecting portion is used for mounting the bottom, and a second surface of the second connecting portion is used for mounting the beam main body, the first connecting portion and the second connecting portion are arranged at a first angle, to connect the bottom and the beam body in different directions. In this way, the first connecting portion and the bottom, and the second connecting portion and the beam body are both detachably connected, so that working personnel can detach the bottom from the beam body via the connecting structures, thereby solving the problem in the related art of poor flexibility in mounting and detachment of a plunger pump base, and reducing the costs of mounting and detachment of a plunger pump.

Compared with the method of connecting a beam body and a plunger pump base by welding in the art known to inventors, in the present application, the bottom can be detachably connected to the beam body by means of connecting structures, which, on the one hand, reduces the mounting difficulty and labor intensity of working personnel, and on the other hand, makes the bottom detachable from the beam body, thereby effectively improving the flexibility of mounting and detachment of the base.

Apparently, the described embodiments are merely a part rather than all of the embodiments of the present disclosure. All other embodiments obtained by a person of ordinary skill in the art based on the embodiments of the present disclosure without any inventive effort shall all fall within the scope of protection of the present disclosure.

The content above is only preferred embodiments of the present disclosure and is not intended to limit the present disclosure. For a person skilled in the art, the present disclosure may have various modifications and variations. Any modifications, equivalent replacements, improvements, etc. made within the spirit and principle of the present disclosure shall all fall within the scope of protection of the present disclosure.

What is claimed is:

1. A connecting structure, wherein the connecting structure is configured to connect a bottom and a beam body, the beam body comprises a beam main body and a wing plate, and the connecting structure comprises:
    a connecting body, comprising a first connecting portion and a second connecting portion which are connected with each other, wherein the first connecting portion comprises a first surface, the second connecting portion comprises a second surface, the first surface is configured to mount the bottom, and the second surface is configured to mount the beam main body;
    wherein a first angle is formed between the first surface and the second surface, and a wing plate mounting space is formed between the first connecting portion and the second connecting portion.

2. The connecting structure as claimed in claim 1, wherein the first surface is a flat surface; or the second surface is a flat surface; or each of the first surface and the second surface is a flat surface.

3. The connecting structure as claimed in claim 1, wherein:
the first surface comprises a first through hole, and a first fastener pass through the first through hole and the bottom to connect the bottom and the connecting structure; or
the second surface comprises a second through hole, and a second fastener pass through the second through hole and the beam main body to connect the beam main body and the connecting structure; or
the first surface comprises a first through hole, and a first fastener pass through the first through hole and the bottom to connect the bottom and the connecting structure, the second surface comprises a second through hole, and a second fastener pass through the second through hole and the beam main body to connect the beam main body and the connecting structure.

4. The connecting structure as claimed in claim 1, wherein the second connecting portion comprises:
a first plate body;
a second plate body; and
a third plate body, disposed opposite the first plate body, the first plate body being connected with the third plate body by the second plate body, a second angle being formed between the first plate body and the second plate body, and a third angle being formed between the second plate body and the third plate body, wherein a plate surface of the second plate body away from the first plate body is the second surface;
wherein the first connecting portion is a fourth plate body, the first plate body, the second plate body, the third plate body and the fourth plate body enclose to form an opening, the opening is the wing plate mounting space, the first plate body and the third plate body are both connected with a plate surface of the fourth plate body, and a plate surface of the fourth plate body away from the first plate body is the first surface.

5. The connecting structure as claimed in claim 4, wherein:
an end face of the first plate body away from the second plate body is a first inclined surface; or
an end face of the third plate body away from the second plate body is a second inclined surface;
or an end face of the first plate body away from the second plate body is a first inclined surface, and an end face of the third plate body away from the second plate body is a second inclined surface.

6. A plunger pump device, wherein the plunger pump device comprises a plunger pump body, a connecting structure and a base, the plunger pump body is disposed on the base, and the base is disposed on a first surface of the connecting structure; the base has a bottom; and the connecting structure is the connecting structure as claimed in claim 1.

7. The plunger pump device as claimed in claim 6, wherein the base comprises:
a base body, the plunger pump body and the connecting structure being respectively positioned at both sides of the base body; and
a plurality of connecting members, the plurality of connecting members being disposed on the base body at intervals along a length direction of the base body; or the plurality of connecting members being disposed on the base body at intervals along a width direction of the base body; or one part of connecting members being disposed on the base body at intervals along a length direction of the base body, and the other part of connecting members being disposed on the base body at intervals along a width direction of the base body, and the plunger pump body being connected with the base body by the connecting members.

8. The plunger pump device as claimed in claim 7, wherein:
the base body comprises a first base body section, a second base body section, a third base body section and a fourth base body section which are connected in an end-to-end manner, the first base body section being disposed opposite the third base body section, and the second base body section being disposed opposite the fourth base body section;
the base body has a third through hole and a fork avoidance slot, and a third fastener pass through a first through hole of the connecting structure and the third through hole, to connect the connecting structure and the base;
the third through hole is disposed on the first base body section; or the third through hole is disposed on the third base body section; or the third through hole is disposed on the first base body section and the third base body section; and
the fork avoidance slot is disposed on the second base body section; or the fork avoidance slot is disposed on the fourth base body section; or the fork avoidance slot is disposed on the second base body section and the fourth base body section.

9. The plunger pump device as claimed in claim 6, wherein the first surface is a flat surface; or the second surface is a flat surface; or each of the first surface and the second surface is a flat surface.

10. The plunger pump device as claimed in claim 6, wherein:
the first surface comprises a first through hole, and a first fastener pass through the first through hole and the bottom to connect the bottom and the connecting structure; or
the second surface comprises a second through hole, and a second fastener pass through the second through hole and the beam main body to connect the beam main body and the connecting structure; or
the first surface comprises a first through hole, and a first fastener pass through the first through hole and the bottom to connect the bottom and the connecting structure, and the second surface comprises a second through hole, and a second fastener pass through the second through hole and the beam main body to connect the beam main body and the connecting structure.

11. The plunger pump device as claimed in claim 6, wherein the second connecting portion comprises:
a first plate body;
a second plate body; and
a third plate body, disposed opposite the first plate body, the first plate body being connected with the third plate body by the second plate body, a second angle being formed between the first plate body and the second plate body, and a third angle being formed between the second plate body and the third plate body, wherein a plate surface of the second plate body away from the first plate body is the second surface;

wherein the first connecting portion is a fourth plate body, the first plate body, the second plate body, the third plate body and the fourth plate body enclose to form an opening, the opening is the wing plate mounting space, the first plate body and the third plate body are both connected with a plate surface of the fourth plate body, and a plate surface of the fourth plate body away from the first plate body is the first surface.

12. The plunger pump device as claimed in claim 11, wherein:
an end face of the first plate body away from the second plate body is a first inclined surface; or
an end face of the third plate body away from the second plate body is a second inclined surface; or
an end face of the first plate body away from the second plate body is a first inclined surface, and an end face of the third plate body away from the second plate body is a second inclined surface.

13. A generator device, wherein the generator device comprises a generator body, a connecting structure and a base; the generator body is disposed on the base; the base is disposed on a first surface of the connecting structure; the base has a bottom; and the connecting structure is the connecting structure as claimed in claim 1.

14. The generator device as claimed in claim 13, wherein:
the first surface comprises a first through hole, and a first fastener pass through the first through hole and the bottom to connect the bottom and the connecting structure; or
the second surface comprises a second through hole, and a second fastener pass through the second through hole and the beam main body to connect the beam main body and the connecting structure; or
the first surface comprises a first through hole, a first fastener pass through the first through hole and the bottom to connect the bottom and the connecting structure, the second surface comprises a second through hole, and a second fastener pass through the second through hole and the beam main body to connect the beam main body and the connecting structure.

15. The generator device as claimed in claim 13, wherein the second connecting portion comprises:
a first plate body;
a second plate body; and
a third plate body, disposed opposite the first plate body, the first plate body being connected with the third plate body by the second plate body, a second angle being formed between the first plate body and the second plate body, and a third angle being formed between the second plate body and the third plate body, wherein a plate surface of the second plate body away from the first plate body is the second surface;
wherein the first connecting portion is a fourth plate body, the first plate body, the second plate body, the third plate body and the fourth plate body enclose to form an opening, the opening is the wing plate mounting space, the first plate body and the third plate body are both connected with a plate surface of the fourth plate body, and a plate surface of the fourth plate body away from the first plate body is the first surface.

16. The generator device as claimed in claim 15, wherein:
an end face of the first plate body away from the second plate body is a first inclined surface; or
an end face of the third plate body away from the second plate body is a second inclined surface;
or an end face of the first plate body away from the second plate body is a first inclined surface, and an end face of the third plate body away from the second plate body is a second inclined surface.

17. A generator device, wherein the generator device comprises a generator body and a connecting structure; the generator body is disposed on a first surface of the connecting structure; a position where the generator body is connected with the first surface is a bottom; and the connecting structure is the connecting structure as claimed in claim 1.

18. The generator device as claimed in claim 17, wherein:
the first surface comprises a first through hole, and a first fastener pass through the first through hole and the bottom to connect the bottom and the connecting structure; or
the second surface comprises a second through hole, and a second fastener pass through the second through hole and the beam main body to connect the beam main body and the connecting structure; or
the first surface comprises a first through hole, a first fastener pass through the first through hole and the bottom to connect the bottom and the connecting structure, the second surface comprises a second through hole, and a second fastener pass through the second through hole and the beam main body to connect the beam main body and the connecting structure.

19. The generator device as claimed in claim 17, wherein the second connecting portion comprises:
a first plate body;
a second plate body; and
a third plate body, disposed opposite the first plate body, the first plate body being connected with the third plate body by the second plate body, a second angle being formed between the first plate body and the second plate body, and a third angle being formed between the second plate body and the third plate body, wherein a plate surface of the second plate body away from the first plate body is the second surface;
wherein the first connecting portion is a fourth plate body, the first plate body, the second plate body, the third plate body and the fourth plate body enclose to form an opening, the opening is the wing plate mounting space, the first plate body and the third plate body are both connected with a plate surface of the fourth plate body, and a plate surface of the fourth plate body away from the first plate body is the first surface.

20. The generator device as claimed in claim 19, wherein:
an end face of the first plate body away from the second plate body is a first inclined surface; or
an end face of the third plate body away from the second plate body is a second inclined surface; or
an end face of the first plate body away from the second plate body is a first inclined surface, and an end face of the third plate body away from the second plate body is a second inclined surface.

* * * * *